(12) United States Patent
Akiyama et al.

(10) Patent No.: US 11,261,942 B2
(45) Date of Patent: Mar. 1, 2022

(54) SPEED REDUCER CAPABLE OF CHANGING SPEED

(71) Applicant: KOBE STEEL, LTD., Kobe (JP)

(72) Inventors: Hiroyuki Akiyama, Takasago (JP); Yasuo Yoshii, Takasago (JP); Yuji Konishi, Takasago (JP); Kazuo Yamaguchi, Takasago (JP); Kazuo Iritani, Takasago (JP)

(73) Assignee: KOBE STEEL, LTD., Kobe (JP)

( * ) Notice: Subject to any disclaimer, the term of this patent is extended or adjusted under 35 U.S.C. 154(b) by 224 days.

(21) Appl. No.: 16/489,616

(22) PCT Filed: Feb. 9, 2018

(86) PCT No.: PCT/JP2018/004613
§ 371 (c)(1),
(2) Date: Aug. 28, 2019

(87) PCT Pub. No.: WO2018/159263
PCT Pub. Date: Sep. 7, 2018

(65) Prior Publication Data
US 2019/0383362 A1    Dec. 19, 2019

(30) Foreign Application Priority Data
Mar. 2, 2017    (JP) .............................. JP2017-039568

(51) Int. Cl.
*F16H 3/089*    (2006.01)
*F16C 23/04*    (2006.01)
(Continued)

(52) U.S. Cl.
CPC ............. *F16H 3/089* (2013.01); *F16C 23/04* (2013.01); *F16C 33/106* (2013.01); *F16H 3/083* (2013.01);
(Continued)

(58) Field of Classification Search
CPC ...... F16H 3/089; F16H 3/083; F16H 57/0471; F16H 63/32; F16C 23/04; F16C 33/106
(Continued)

(56) References Cited

U.S. PATENT DOCUMENTS 8,795,115 B2 *    8/2014   Puiu ........................ B60K 6/48
                                                                  475/5
9,267,550 B2 *    2/2016   Nakamura ............. F16D 11/00
(Continued)

FOREIGN PATENT DOCUMENTS

EP    2 228 570 A1    9/2010
JP    61-189318 U    11/1986
(Continued)

OTHER PUBLICATIONS

International Search Report dated May 15, 2018 in PCT/JP2018/004613 filed on Feb. 9, 2018.
(Continued)

*Primary Examiner* — Ha Dinh Ho
(74) *Attorney, Agent, or Firm* — Oblon, McClelland, Maier & Neustadt, L.L.P.

(57) ABSTRACT

A speed reducer capable of reliably reducing and changing speed while suppressing heat generation and abrasion includes: a plurality of gears rotatably supported on an output shaft; a shifter engageable with an engagement gear selected from the plurality of gears to couple the engagement gear to the output shaft; and a plurality of bushes disposed in an annular groove formed in the shifter to move the shifter to the engagement gear and thereby engage the shifter with the engagement gear; and a bush support supporting the plurality of bushes so as to allow them to swing individually.

9 Claims, 15 Drawing Sheets

(51) Int. Cl.
  *F16C 33/10* (2006.01)
  *F16H 3/083* (2006.01)
  *F16H 57/04* (2010.01)
  *F16H 63/32* (2006.01)
(52) U.S. Cl.
  CPC ......... *F16H 57/0471* (2013.01); *F16H 63/32* (2013.01); *F16H 2200/0034* (2013.01)
(58) Field of Classification Search
  USPC .......................................................... 74/335
  See application file for complete search history.

(56) References Cited

U.S. PATENT DOCUMENTS

| | | | |
|---|---|---|---|
| 9,463,691 B1* | 10/2016 | Mastie | B60K 23/0808 |
| 9,694,713 B2* | 7/2017 | Kawai | B60L 15/08 |
| 2008/0302624 A1* | 12/2008 | Steinz | F16D 23/06 |
| | | | 192/53.341 |

FOREIGN PATENT DOCUMENTS

| | | |
|---|---|---|
| JP | 2011-137496 A | 7/2011 |
| JP | 2013-181620 A | 9/2013 |

OTHER PUBLICATIONS

English translation of the International Preliminary Report on Patentability and Written Opinion of the International Searching Authority dated Sep. 12, 2019 in PCT/JP2018/004613, 9 pages.

* cited by examiner

SPEED REDUCER CAPABLE OF CHANGING SPEED

TECHNICAL FIELD

The present invention relates to a speed reducer including an input shaft and an output shaft and being capable of changing the rotational speed of the output shaft.

BACKGROUND ART

As means for transmitting a torque generated by a power device such as a motor to a driven rotary shaft is known a speed reducer disclosed in Patent Literature 1. The speed reducer includes a gear mechanism for transmitting a torque applied to an input shaft to an output shaft, being capable of changing the rotational speed of the output shaft, the speed reducer being used, for example, in a kneading extruder, a continuous kneader, and a rolling mill.

Patent Literature 1 provides description about a kneading extruder and a continuous kneader in paragraphs [0002] to [0008]. Each of the kneading extruder and the continuous kneader includes an electric motor, and a speed reducer for transmitting the torque to a rotor or a screw shaft with reducing the rotational speed of the electric motor to increase torque. The rotor or the screw shaft is rotationally driven to thereby knead, for example, resin or rubber. Such kneading extruders and continuous kneaders are required to adjust the amount of material to be kneaded, and it is desirable for the adjustment that the rotational speed of the rotor or the screw shaft is changeable. Also in other machines, for example in rolling mills, it is preferable to change the rolling speed for producing a wide variety of rolled products.

For example, adjusting the rotational speed of a rotor or a screw shaft in a kneading extruder or a continuous kneader requires a speed-variable driving device, and a two-speed changeable speed reducer is often used for a large machine because variable speed operation of an electric motor constituting the driving device by primary frequency control will be disadvantageous in terms of cost. The speed reducer includes a rotational speed selector, such as a clutch, that enables the rotational speed of an output shaft to be changed between two rotational speeds, namely, a low speed and a high speed, while the rotational speed of an input shaft remains constant. Similarly, also in rolling mills, a two-speed changeable speed reducer is often used.

FIG. 11 of Patent Literature 1 shows a conventional two-speed changeable speed reducer that is used for a kneading excluder, a continuous kneader, a rolling mill, or the like. The two-speed changeable speed reducer includes, as shown in FIG. 15, an input shaft 101 to be rotationally driven by an electric motor, a small low-speed gear 102 and a small high-speed gear 103 that are secured to the outer circumferential surface of the input shaft at a predetermined distance from each other, a large low-speed gear 105 meshing with the small low-speed gear 102, a large high-speed gear 106 meshing with the small high-speed gear 103, an output shaft 104 rotatably disposed at a predetermined distance from the input shaft 101, and a rotational speed selector 107. The rotational speed selector 107 includes the large low-speed gear 105 and the large high-speed gear 106, one of which is secured to the outer circumferential surface of the output shaft 104. The rotational speed selector 107 has a function to rotate the output shaft 104 and selectively change the rotational speed thereof between two rotational speeds, namely, a low speed and a high speed.

The rotational speed selector 107 includes an external spline teeth 104a formed in an axially central portion of the output shaft 104 and having a predetermined length, a shifter 108 disposed between the large low-speed gear 105 and the large high-speed gear 106 and fitted on the external spline teeth 104a, the shifter 108 being formed with an outer peripheral annular groove in a middle portion thereof, and a cam follower 118 disposed in the groove and operable to move the shifter 108 to either the large low-speed gear 105 or the large high-speed gear 106 to thereby couple the shifter 108 to the large low-speed gear 105 or the large high-speed gear 106, and a clutch pivotally supporting the cam follower 118.

FIG. 15 shows the shifter 108 being in a neutral position coupled to neither of the large low-speed gear 105 and the large high-speed gear 106. The clutch is manually activated by operating a not-graphically-shown shift lever, and the shifter 108 can be thereby moved from the position shown in FIG. 15 to the large low-speed gear 105 or the large high-speed gear 106. The shifter 108 is coupled to the large low-speed gear 105 or the large high-speed gear 106 while remaining outfitted on the external spline teeth 104a of the output shaft 104.

The torque applied by the electric motor to the input shaft 101 is transmitted to the large low-speed gear 105 through the small low-speed gear 102, while being transmitted to the large high-speed gear 106 through the small high-speed gear 103. In addition, one of the large low-speed gear 105 and the large high-speed gear 106 is selectively coupled to the output shaft 104 through the shifter 108, which allows the output shaft 104 to be rotated at low speed when coupled to the large low-speed gear 105 and to be rotated at high speed when coupled to the large high-speed gear 106. The rotational speed of the output shaft 104 is thus selectively changed between a low speed and a high speed.

However, the operating force for coupling the shifter 108 to the large low-speed gear 105 or the large high-speed gear 106 is only a force with which the cam follower 118 supported by the clutch presses the shifter 108 in point contact or linear contact. The press is therefore insufficient, which may prevent changing operation from being well performed, particularly in a large two-speed changeable reduction gear. Besides, increase in size of the speed reducer and in transmission power involves a problem about the allowable rotational speed, the load capacity and the life of the cam follower 118.

As means for solving the above problems, Patent Literature 1 discloses a technique to allow the cam follower 118 to come into surface contact with the shifter 108 instead of coming into above-described point contact or linier contact therewith. This technique makes it possible to reliably change the rotational speed of the output shaft 104. Moreover, the surface contact of the cam follower 118 and the shifter 108 with each other allows the allowable load capacity to be increased. Furthermore, the allowable rotational speed and the life of each component is not affected, which allows life extension to be expected.

Specifically, Patent Literature 1 discloses the use of a plate-like bush in place of the cam follower 118 shown in FIG. 15. The bush has, in a side view, a single arc shape or a plurality of semi-circular shapes vertically spaced, or a complete circular shape. The bush has a press surface, which presses an opposed surface of the shifter 108 to thereby move the shifter 108 toward either the large low-speed gear 105 or the large high-speed gear 106 and couple the shifter 108 thereto, thus selectively changing the rotational speed of the output shaft 104.

However, in recent years, kneaders and other similar machines have been upsized, which involves upsizing two-speed changeable speed reducers to be equipped therein; this results in increase in the load on the devices, for example, increase in transmission power. Accordingly, the technique disclosed in Patent Literature 1 needs to be modified to increase the allowable load capacity of the bush when the bush presses the shifter 108 through the surface contact of the press surface of the bush and the opposition surface of the shifter 108 with each other. The allowable load capacity can be increased by increasing the area of the press surface of the bush; however, this involves upsizing of the bush radially of the shifter 108, i.e., increase in radial thickness of the bush in the side view. This causes upsizing of the entire two-speed changeable speed reducer and increase in manufacturing cost. On the other hand, upsizing the single bush circumferentially of the shifter 108, for example, forming the bush in a semi-circular shape or a complete circular shape in the side view, involves increase in the dimension of the bush circumferentially of the shifter 108 relatively to the dimension of the bush radially of the shifter 108. This hinders lubricant oil film from being formed to separate the press surface from the opposition surface, generating a possibility of abnormal heat generation and abrasion involved by the rotation of the shifter 108 or operational failure of the two-speed changeable speed reducer.

Besides, the increase in transmission power involves increase in the load in such a direction as to separate the shifter 108 from the large low-speed gear 105 or the large high-speed gear 106 to which the shifter 108 is coupled. This load, when exceeding the load capacity of the bush, may cause abnormal abrasion and, in the worst case, disengagement of the shifter 108 from the large low-speed gear 105 or the large high-speed gear 106.

CITATION LIST

Patent Literature

Patent Literature 1: Japanese Unexamined Patent Publication No. 2011-137496

SUMMARY OF INVENTION

It is an object of the present invention to provide a speed reducer including a shifter for changing the speed of an output shaft and a bush operable to press the shifter to bring it into engagement with a gear for speed reduction, the speed reducer being capable of suppressing heat generation and abrasion due to surface contact of the bush and the shifter with each other while reliably retaining the engagement of the shifter with the gear.

Provided is a speed reducer including: an input shaft; an output shaft; a plurality of gears rotatably supported on the output shaft; a shifter mounted on the output shaft movably in an axial direction of the output shaft relatively to the output shaft so as to be capable of being selectively engaged with each of the plurality of gears, the shifter having a ring-shape to be fitted on the output shaft and being operable to couple an engagement gear, which is a gear included in the plurality of gears and engaged with the shifter, to the output shaft to thereby allow a torque of the input shaft to be transmitted to the output shaft through the engagement gear; a plurality of bushes operable to press the shifter to move the shifter to the engagement gear and to thereby bring the shifter into engagement with the engagement gear; and a bush support that supports the plurality of bushes. The shifter has an outer circumferential surface formed with an annular groove extending circumferentially of the shifter and being opened radially outward of the shifter. The plurality of bushes are disposed in the annular groove and spaced circumferentially of the shifter, each of the plurality of bushes having a press surface to come into surface contact with the shifter and press the shifter in a direction parallel to the axial direction of the output shaft. The bush support supports the plurality of bushes so as to allow each of the plurality of bushes to swing individually and relatively to the bush support at least in the direction parallel to the axial direction.

DESCRIPTION OF EMBODIMENTS

An embodiment of the present invention will be described with reference to the accompanying drawings. The embodiment described below merely illustrates an example of the present invention and is not intended to limit the configurations of the present invention.

Figure 1:
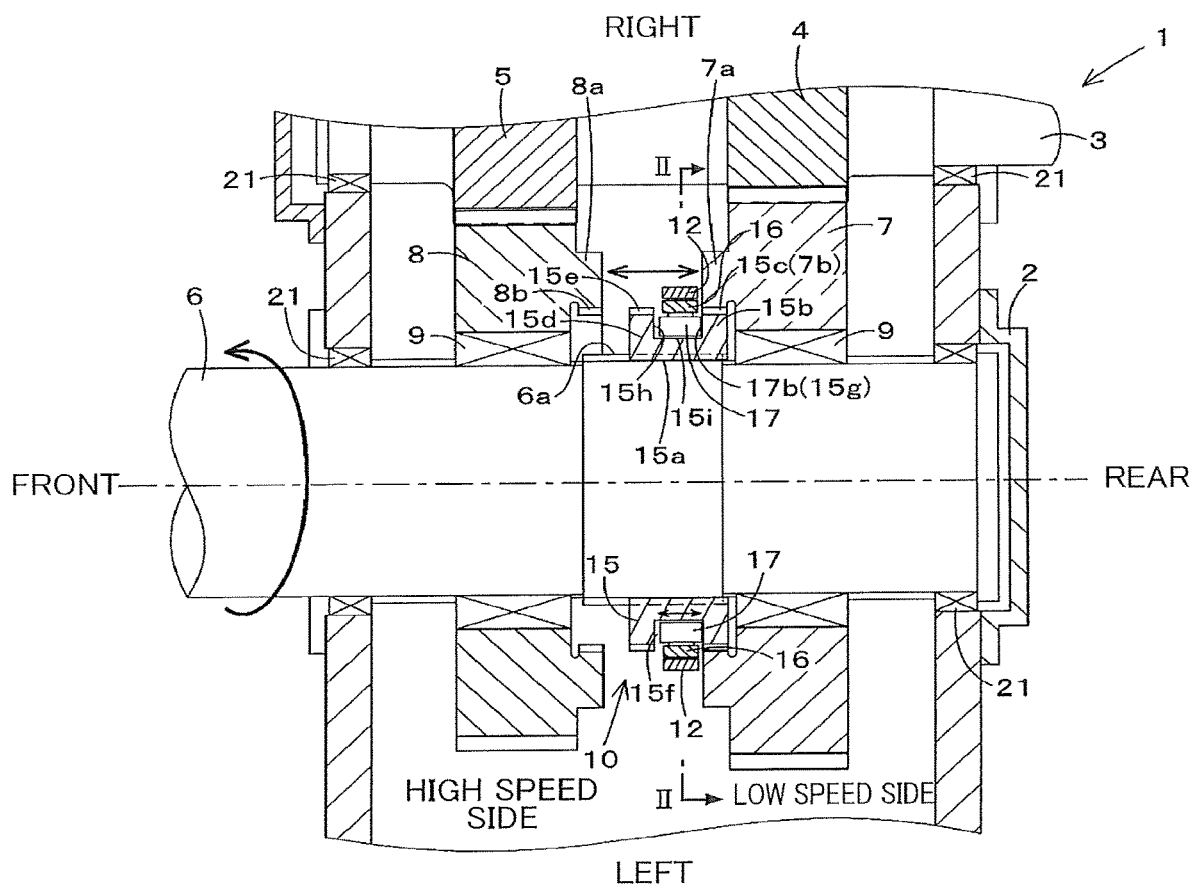
FIG. 1 is a sectional plan view of a speed reducer according to an embodiment of the present invention.

FIG. 1 shows a speed reducer 1 according to an embodiment of the present invention. The speed reducer 1 includes an input shaft 3, an output shaft 6, a plurality of input gears mounted on the input shaft 3, a plurality of output gears rotatably supported on the output shaft 6, each being capable of meshing with one of the input gears, a shifter 15, and a housing 2. The shifter 15 is mounted on the output shaft 6 movably in the axial direction of the output shaft 6 so as to be capable of being engaged with an engagement gear that is arbitrarily selected from the plurality of output gears. By engagement with the engagement gear, the shifter 15 couples the engagement gear to the output shaft 6, thereby enabling the torque of the input shaft 3 to be transmitted to the output shaft 6 through the engagement gear.

The selection of the engagement gear from the plurality of output gears makes it possible to change the ratio of the number of revolutions of the output shaft 6 to the number of revolutions of the input shaft 3, namely, a reduction ratio. In other words, the selection allows the rotational speed of the output shaft 6 to be selectively changed to any of different rotational speeds while the rotational speed of the input shaft 3 remains constant.

The speed reducer 1 according to the present embodiment is a two-speed type of speed reducer capable of switching the rotational speed of the output shaft 6 between a high speed and a low speed. First will be described the basic configuration of the speed reducer 1 with reference to the accompanying drawings. In the description given below, the right-and-left direction (width direction) of the speed reducer 1 corresponds to the top-and-bottom direction of the drawing sheet of FIG. 1, the front-and-rear direction of the speed reducer 1 corresponds to the left- and right direction of the drawing sheet of FIG. 1, and the top-and-bottom direction of the speed reducer 1 corresponds to the direction orthogonal to the drawing sheet surface of FIG. 1. There will be a case where the upper and lower sides of the drawing sheet of FIG. 1 is referred to as the "input shaft side" and "output shaft side", respectively.

The selectable speed reducer 1 shown in FIG. 1 receives a torque input from an upper right side of the drawing sheet of FIG. 1 and outputs a torque to a lower left side of the drawing sheet of FIG. 1. Specifically, there is disposed a not-graphically-shown drive source upstream on the right side of the drawing sheet of FIG. 1 to apply a torque to the input shaft 3. The rotational speed of the input shaft 3 is reduced at a predetermined reduction ratio in the speed reducer 1, so that the output shaft 6 is rotated at a lower speed than that of the input shaft 3. The speed reducer 1 can be applied to various types of power devices.

In the present embodiment, the plurality of input gears include a small low-speed gear 4 and a small high-speed gear 5, and the plurality of output gears include a large low-speed gear 7 and a large high-speed gear 8. The small low-speed gear 4 stays in constant mesh with the large low-speed gear 7, and the small high-speed gear 5 stays in constant mesh with the large high-speed gear 8. The shifter 15 is disposed between the large low-speed gear 7 and the large-high speed gear 8 so as to be allowed to be selectively engaged with either the large low-speed gear 7 or the large high-speed gear 8. Thus, although being of a constant-mesh type, the speed reducer 1 according to this embodiment allows the rotational speed of the output shaft 6 to be selectively changed between the low speed and the high speed through the selective engagement of the shifter 15 with either of the large gears 7 and 8.

The housing 2 rotatably supports the input shaft 3 and the output shaft 6 and accommodates the gears 4, 5, 7 and 8, and the shifter 15. The torque generated by the drive source is, therefore, introduced into the housing 2 through the input shaft 3, and the shifter 15 in the housing 2 is engaged with the engagement gear selected from the two output gears, namely, the large gears 7 and 8, to couple the engagement gear to the output shaft 6; this enables the rotation of the input shaft 3 to be transmitted to the output shaft 6 with the reduction in the speed thereof to a predetermined speed, that is, allows the torque to be output from the output shaft 6 to the outside of the housing 2.

The housing 2 has a box-shape and rotatably supports the input shaft 3 and the output shaft 6 that pass through the housing 2 in the respective axial directions. Besides, the housing 2 accommodates the small gears 4 and 5 that are mounted on the input shaft 3 and the large gears 7 and 8 and the shifter 15 that are mounted on the output shaft 6. The input shaft 3 has an outer diameter sufficient for receiving the torque input from the drive source. The input shaft 3 is a long rod made of, for example, a steel material, and is supported on the housing 2 so as to have an axis extending horizontally and in a front-and-rear direction. The input shaft 3 is rotatably supported on the housing 2 through bearings 21 mounted on the housing 2.

As shown in FIG. 1, one of the opposite ends of the input shaft 3 (an end located at the upper right side of the drawing sheet of FIG. 1) serves as an input end, protruding rearward beyond the housing 2 and connected to the not-graphically-shown drive source such as an electric motor disposed outside (upstream of) the housing 2. The input shaft 3 is rotated by a torque applied by the drive source and inputs the torque to the housing 2. The small low-speed gear 4 and the small high-speed gear 5 are mounted on the outer circumferential surface of the input shaft 3 so as to be spaced at a predetermined distance in the axial direction of the input shaft 3.

The small low-speed gear 4 is a disk-shaped member, having an outer circumferential surface formed with a predetermined number of teeth. The small low-speed gear 4 is formed with a through-hole in its central portion when viewed in the axial direction thereof, the through-hole allowing the input shaft 3 to pass therethrough. In the present embodiment, the small high-speed gear 5 is disposed at the front side of the small low-speed gear 4. The small high-speed gear 5 is also a disk-shaped member, having an outer circumferential surface formed with a predetermined number of teeth. The small high-speed gear 5, however, has a larger outer diameter than that of the small low-speed gear 4 and has a different number of teeth from those of the small low-speed gear 4. The small high-speed gear 5 is also formed with a through-hole formed in its central portion when viewed in the axial direction thereof, the through-hole allowing the input shaft 3 to pass therethrough. The respective axes of the small low-speed gear 4 and the small high-speed gear 5 coincide with the axis of the input shaft 3.

The small low-speed gear 4 and the small high-speed gear 5 are fitted on the input shaft 3 so as to be rotated integrally with the input shaft 3, which passes through their respective through-holes. The output shaft 6 is a long rod having substantially the same shape and substantially the same material as the input shaft 3, disposed so as to have an axis extending horizontally and in the front-and-rear direction. The output shaft 6 is supported on the housing 2 rotatably and in parallel to the input shaft 3, through the bearings 21 mounted on the housing 2. The output shaft 6 is, thus, disposed at the left side of the input shaft 3 at a distance from the input shaft 3 in the right-and-left direction, with its axis extending in parallel to the axis of the input shaft 3.

In the present embodiment, one of the opposite ends of the output shaft 6 (an end located at the lower left side of the drawing sheet of FIG. 1), i.e., the end opposite to the input end of the input shaft 3 in the front-and-rear direction, serves as an output end protruding frontward beyond the housing 2 and connected to a driving target disposed outside (downstream of) the housing 2. Thus, the output shaft 6 applies a torque to the external driving target, the torque being transmitted from the input shaft 3 to the output shaft 6 at a predetermined reduction ratio. The output end of the output shaft 6 may alternatively protrude from the housing 2 in the same direction as that in which the input end of the input shaft 3 protrudes beyond the housing 2. For example, it is also acceptable that both the input end of the input shaft 3 and the output end of the output shaft 6 protrude frontward beyond the housing 2.

The large low-speed gear 7 and the large high-speed gear 8 are disposed on the outer circumferential surface of the output shaft 6 so as to be spaced in the axial direction of the output shaft 6. In the present embodiment, the large high-speed gear 8 is disposed at the front side of the large low-speed gear 7. The outer circumferential surface of the output shaft 6 is formed with external spline teeth 6a between the large low-speed gear 7 and the large high-speed gear 8.

The length of the external spline teeth 6a in the front-and-rear direction substantially corresponds to the distance between the large low-speed gear 7 and the large high-speed gear 8. Specifically, the opposite ends of the external spline teeth 6a in the front-and-rear direction are located inside an annular projection (rear projection) 7a formed on the large low-speed gear 7 and inside an annular projection (front projection) 8a formed on the large high-speed gear 8, respectively.

The shifter 15 is disposed around the output shaft 6 so as to cover the outer circumferential surface of the output shaft 6 over its entire periphery. The shifter 15 has an inner circumferential surface formed with internal spline teeth 15a, which are in mesh with the external spline teeth 6a of the output shaft 6.

The large low-speed gear 7, which is one of the output gears, is disposed at a position where the large low-speed gear 7 is opposed to the small low-speed gear 4, so as to keep the teeth formed on the outer circumferential surface of the large low-speed gear 7 be in constant mesh with the teeth formed on the outer circumferential surface of the small low-speed gear 4, which is one of the input gears. Similarly, the large high-speed gear 8, which is one of the output gears, is disposed at a position where the large high-speed gear 8 is opposed to the small high-speed gear 5, so as to keep the teeth formed on the outer circumferential surface of the large high-speed gear 7 be in constant mesh with the teeth formed on the outer circumferential surface of the small high-speed gear 5, which is one of the input gears.

The gap between the large low-speed gear 7 and the large high-speed gear 8 constituting the output gears is, therefore, approximately equal to the gap between the small low-speed gear 4 and the small high-speed gear 5 constituting the input gears.

The large low-speed gear 7 and the large high-speed gear 8 constituting the output gears are rotatably mounted on the outer circumferential surface of the output shaft 6 through respective bearings 9 so as to be spaced in a direction parallel to the axis of the output shaft 6 shown by the dashed-and-dotted line of FIG. 1, i.e., a direction parallel to the axial direction of the output shaft 6.

The large low-speed gear 7 is a disk-shaped member, having an outer circumferential surface formed with a predetermined number of teeth. The large low-speed gear 7 has the same width as the small low-speed gear 4, which is one of the input gears. The large low-speed gear 7 is formed with a through-hole in its central portion when viewed in the axial direction thereof, the through-hole allowing the output shaft 6 to pass therethrough. The bearing 9 is fitted in this through-hole. The bearing 9 includes an outer race secured to the inner circumferential surface of the large low-speed gear 7, which surface surrounds the through-hole, and an inner race secured to the outer circumferential surface of the output shaft 6. In short, the large low-speed gear 7 is rotatably mounted on the output shaft 6 through the bearing 9.

The rear projection 7a is a portion that protrudes frontward beyond a front wall face that is one of the opposite wall faces of the large low-speed gear 7 and faces frontward (that is, faces the large high-speed gear 8), having a ring-shape around the axis of the output shaft 6 when viewed in the axial direction of the output shaft 6. The rear projection 7a has an inner circumferential surface that surrounds the entire periphery of the output shaft 6, the inner circumferential surface being formed with an internal spline teeth 7b.

The large high-speed gear 8 is also a disk-shaped member, having an outer circumferential surface formed with a predetermined number of teeth. The large high-speed gear 8, however, has a smaller diameter than that of the large low-speed gear 7 and has a different number of teeth from that of the large low-speed gear 7. The large high-speed gear 8 has the same width as the small high-speed gear 5, which is one of the input gears. The respective axes of the large high-speed gear 8 and the large low-speed gear 7 coincide with the axis of the output shaft 6.

The large high-speed gear 8 is formed with a through-hole in its central portion when viewed in the axial direction thereof, the through-hole allowing the output shaft 6 to pass therethrough. The bearing 9 is fitted in this through-hole. The bearing 9 includes an outer race secured to the inner circumferential surface of the large high-speed gear 8, which surface surrounds the through-hole, and an inner race secured to the outer circumferential surface of the output shaft 6. Through the bearing 9, the large high-speed gear 8 is mounted on the output shaft 6 so as to be rotatable relatively thereto.

The front projection 8a protrudes rearward from a rear wall face, which is one of the opposite wall faces of the large high-speed gear 8 and faces rearward (i.e., faces the large low-speed gear 7), having a ring-shape around the axis of the output shaft 6 when viewed in the axial direction of the output shaft 6. The front projection 8a has an inner circumferential surface surrounding the entire periphery of the output shaft 6 and formed with an internal spline teeth 8b extending over the entire periphery of the inner circumferential surface. The internal spline teeth 8b have the same pitch diameter as the internal spline teeth 7b formed on the large low-speed gear 7. In short, the rear projection 7a and the front projection 8a have the same inner diameter. The rear projection 7a and the front projection 8a are formed in respective ring-shapes and opposed to each other with the coincidence of the respective axes with each other.

It is preferable that the axial gap between the small low-speed gear 4 and the small high-speed gear 5 that are mounted on the input shaft 3 is approximately equal to the axial gap between the large low-speed gear 7 and the large high-speed gear 8 that are mounted on the output shaft 6. The gaps are set at least so as to allow the small low-speed gear 4 and the large low-speed gear 7 to be meshed with each other and the small high-speed gear 5 and the large high-speed gear 8 to be meshed with each other, respectively.

The purpose of mounting the small gears 4 and 5 on the input shaft 3 and mounting the large gears 7 and 8 on the output shaft 6 is to rotate the output shaft 6 at a lower speed than that of the input shaft 3 and with a higher torque than that of the input shaft 3. Specifically, each of the input gears has a smaller outer diameter than that of the corresponding output gear so as to allow the input gears to be meshed with the output gears. The designations "small gears 4 and 5"

referring to the input gears and the designations "large gears 7 and 8" referring to the output gears indicate the relative sizes of the respective outer diameters.

Regarding the input gears, the small low-speed gear 4 has a smaller outer diameter than that of the small high-speed gear 5. On the other hand, regarding the output gears, the large low-speed gear 7 has a larger outer diameter than that of the large high-speed gear 8.

The speed reducer 1 shown in FIGS. 1 to 4 further includes: a plurality of bushes 17; a pair of right and left support members 16 that supports the plurality of bushes 17; and a clutch 11 for moving the plurality of bushes with the support members 16. The support members 16 and the clutch 11 constitute a bush support movably supporting the plurality of bushes 17. The bush support and the plurality of bushes 17 constitute, in combination with the shifter 15, a speed changing means 10 that selectively changes the rotational speed of the output shaft 6.

The shifter 15 is moved between the large low-speed gear 7 and the large high-speed gear 8 to be engaged with the engagement gear that is one of the gears, thereby coupling the engagement gear to the output shaft 6. The plurality of bushes 17 press the shifter 15 in the axial direction to move it to one of the large gears 7 and 8 (namely, the engagement gear). The clutch 11 moves the shifter 15 together with the support members 16 in the axial direction on the outer circumferential surface of the output shaft 6. The speed changing means 10 is, thus, means for changing the rotational speed of the output shaft 6 by switching the torque transmission path between the large low-speed gear 7 and the large high-speed gear 8, through moving the shifter 15 to the engagement gear that is either of the large low-speed gear 7 and the large high-speed gear 8 and coupling the shifter 15 to the engagement gear.

Figure 2:
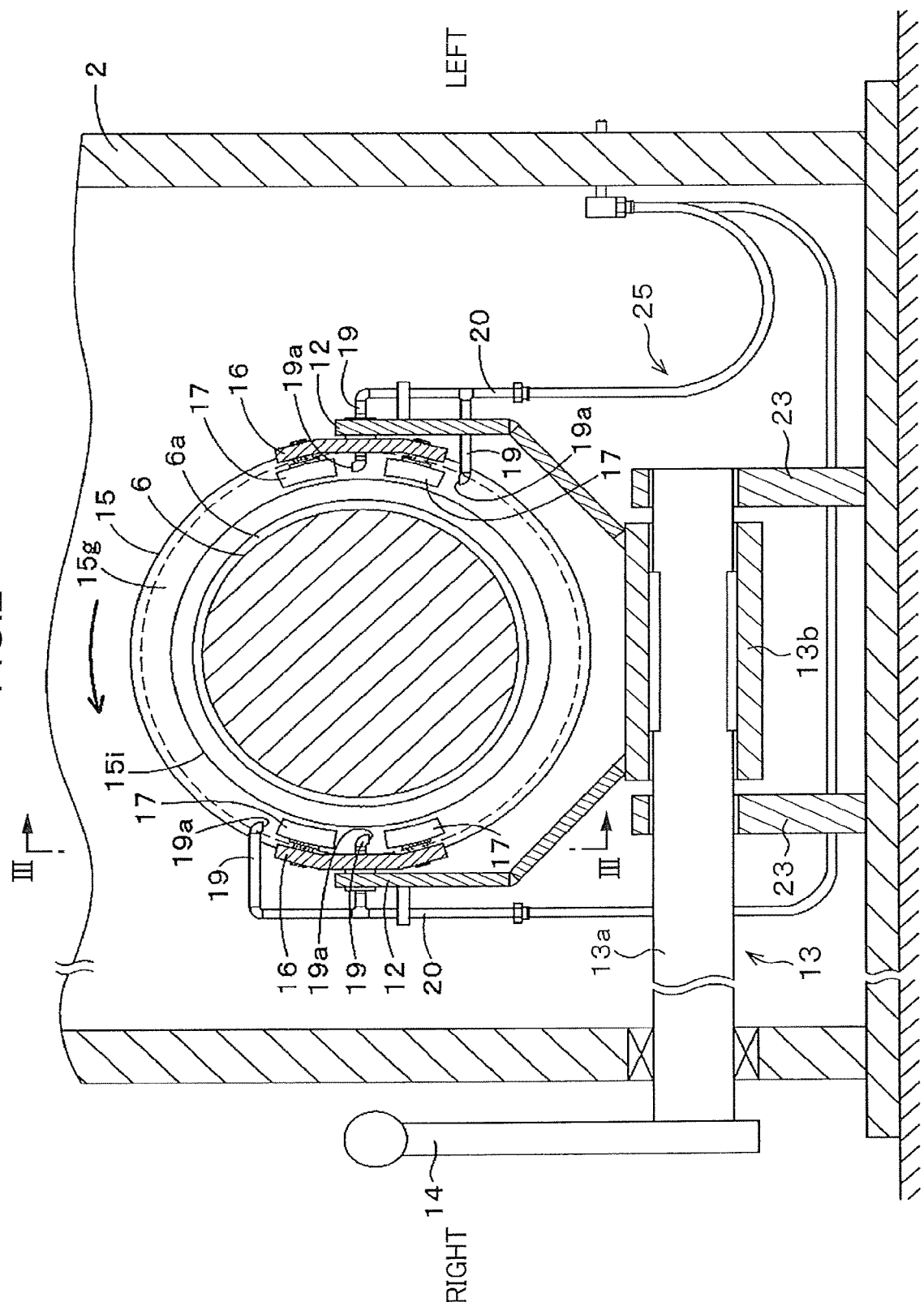
FIG. 2 is a sectional elevational view taken along line II-II of FIG. 1.

As shown in FIG. 2, the clutch 11 includes a pair of right and left arm members 12, a main body 13, and a clutch lever 14. The arm members 12 are disposed to the right side and left side of the output shaft 6, respectively, and support the support members 16 supporting the plurality of bushes 17 as described in detail later, respectively. The main body 13 is disposed under the output shaft 6 and supports the arm members 12. Specifically, the main body 13 includes a rotary shaft 13a and a rotary sleeve 13b. The rotary shaft 13a is rotatably supported on a pair of right and left support walls 23 each standing up on the bottom wall of the housing 2. The rotary sleeve 13b is disposed around the rotary shaft 13a in an area between the paired support walls 23 and secured to the rotary shaft 13a so as to be integrally rotated with the rotary shaft 13a. Each of the arm members 12 is connected to the rotary sleeve 13b so as to be integrally rotated with the rotary sleeve 13b. The lever member 14 is a member to which an operation is applied to move the main body 13 in the axial direction of the output shaft 6.

Each of the arm members 12 is a rod member disposed so as to extend upward from the rotary sleeve 13b of the main body 13. Each of the arm member 12 has an upper end, on which the support member 16 is mounted. The arm members 12 are disposed so as to be opposed to each other across the output shaft 6 in the right-and-left direction.

The rotary shaft 13a of the main body 13 is a rod member disposed under the output shaft 6 and extending in the right-and-left direction, and supports the arm members 12 at a position therebelow, in cooperation with the rotary sleeve 13b. One of the opposite left and right ends (the right end in the present embodiment) of the rotary shaft 13a protrudes to the outside (to the right in the present embodiment) of the housing 2 beyond a side wall of the housing 2, and a proximal end of the clutch lever 14 is mounted on a distal portion of the protruding end.

The clutch lever 14 has a rod-shape extending upward from the distal portion of the protruding end of the rotary shaft 13a. The clutch lever 14 has an upper end, which forms a spherical grip. By an operation applied to the clutch lever 14 to tilt it rearward, the rotary shaft 13a and the rotary sleeve 13b are rotated about a horizontal axis to (rotationally) move the arm members 12 rearward, causing the plurality of bushes 17 to press the shifter 15 rearward to thereby bring the shifter 15 into engagement with the large low-speed gear 7. On the other hand, by an operation applied to the clutch lever 14 to tilt it frontward, the rotary shaft 13a and the rotary sleeve 13b are rotated about the horizontal axis to (rotationally) move the arm members 12 frontward, causing the plurality of bushes 17 to press the shifter 15 frontward to thereby bring the shifter 15 into engagement with the large high-speed gear 8.

The shifter 15 is an annular (ring-shaped) member, disposed so as to surround the outer circumferential surface of the output shaft 6. The axis of the shifter 15 coincides with the axis of the output shaft 6.

The shifter 15 has a cross-section opened radially outward, for example, substantially in the U-shape. On the other hand, the inner circumferential surface of the shifter 15 (circumferential surface facing the output shaft 6) is formed with the internal spline teeth 15a extending over its entire periphery. The internal spline teeth 15a have the same pitch diameter as the external spline teeth 6a formed on the outer circumferential surface of the output shaft 6, being kept in constant mesh with the external spline teeth 6a. Thus, the inner diameter of the shifter 15 is approximately equal to the outer diameter of the output shaft 6.

Thus fitting the shifter 15 to the output shaft 6 at a position outside the output shaft 6 through the mesh of the internal spline teeth 15a of the shifter 15 with the external spline teeth 6a of the output shaft 6 allows the shifter 15 to be moved in the direction in which the external spline teeth 6a extend, namely, the axial direction, while the shifter 15 is prevented from relative rotation to the output shaft 6.

The front and rear ends of the shifter 15 in the axial direction form a pair of front projection 15d and a rear projection 15b, respectively. The front projection 15d and the rear projection 15b protrude radially outward of the output shaft 6 beyond a middle portion therebetween.

The rear projection 15b is allowed to be moved to a rear engagement position on the inner side of the rear projection 7a of the large low-speed gear 7, and to be fitted to the rear projection 7a at the engagement position. Similarly, the front projection 15d is allowed to be moved to a front engagement position on the inner side of the front projection 8a of the large high-speed gear 8, and to be fitted to the front rear projection 8a at the front engagement position. The projections 15b and 15d have approximately the same thicknesses as the projections 7a and 8a in the front-and-rear direction.

Specifically, the rear projection 15b has an outer circumferential surface, which is formed with external spline teeth 15c extending over its entire periphery. The external spline teeth 15c have the same pitch diameter as the internal spline teeth 7b formed on the rear projection 7a, and come into mesh with the internal spline teeth 7b when the rear projection 15b is moved to the rear engagement position. Thus, the rear projection 7a is engaged with the rear projection 15b.

Similarly, the front projection 15d also has an outer circumferential surface, which is formed with external spline teeth 15e extending over its entire periphery. The external spline teeth 15e have the same pitch diameter as the internal spline teeth 8b formed on the front projection 8a, and come into mesh when the front projection 15d is moved to the front engagement position. Thus, the front projection 8a is engaged with the front projection 15d. Accordingly, the rear projection 15b and the front projection 15d of the shifter 15 each have an outer diameter approximately equal to the inner diameter of the rear projection 7a of the large low-speed gear 7 and the inner diameter of the front projection 8a of the large high-speed gear 8. It is preferable that the external spline teeth 15c of the rear projection 15b and the external spline teeth 15e of the front projection 15d have the same pitch diameter.

As shown in FIGS. 1 to 4, the outer circumferential surface of the shifter 15 is formed with an annular groove 15f extending continuously over its entire periphery. The annular groove 15f has a cross-section opened radially outward in a central portion of the shifter 15 in the front-and-rear direction. In the cross section of the shifter 15, the annular groove 15f is an area defined between the rear projection 15b and the front projection 15d and recessed radially inward relatively to the projections 15b and 15d, for example, recessed substantially in the U-shape. Specifically, the annular groove 15f is defined by an annular front wall surface 15h that is the rear face of the front projection 15d, an annular rear wall surface 15g that is the front face of the rear projection 15b, and a bottom surface 15i that is the outer circumferential surface of the shifter 15 between the projections 15d and 15b. The annular groove 15f has a width (i.e., a dimension in the front-and-rear direction) and a depth (i.e., a radial dimension) sufficient to receive the plurality of bushes 17.

The front wall surface 15h serves as a front opposition surface of the shifter 15 that is opposed to respective front faces of the plurality of bushes 17 in the pushing direction. The rear wall surface 15g serves as a rear opposition surface of the shifter 15 that is opposed to respective rear faces of the plurality of bushes 17 in the pushing direction.

As shown in FIGS. 1 to 5, the plurality of bushes 17 are members that press the shifter 15 in the axial direction of the output shaft 6 to slide it in the same direction on the outer circumferential surface of the output shaft 6, thereby moving the shifter 15 to the engagement gear arbitrarily selected from the large low-speed gear 7 and the large high-speed gear 8. The plurality of bushes 17 are disposed in the annular groove 15f and spaced circumferentially of the shifter 15.

The right and left support members 16 support respective bushes 17 individually, so as to allow the plurality of bushes 17 to swing. As shown in FIG. 2, each of the support members 16 is formed of a member extending along the circumference of the output shaft 6. These support members 16 are disposed to the right and left sides of the output shaft 6, respectively, so as to be opposed to each other across the output shaft 6. In the present embodiment, the support member 16 corresponds to a first support and the arm member 12 of the clutch 11 corresponds to a second support.

The support members 16 are supported by the arm members 12 of the clutch 11, respectively, at the axially central portion of the output shaft 6. The support member 16 has opposite upper and lower ends each serving as a support portion 16a that supports the bushes 17 so as to allow the bushes to swing individually.

Figure 5:
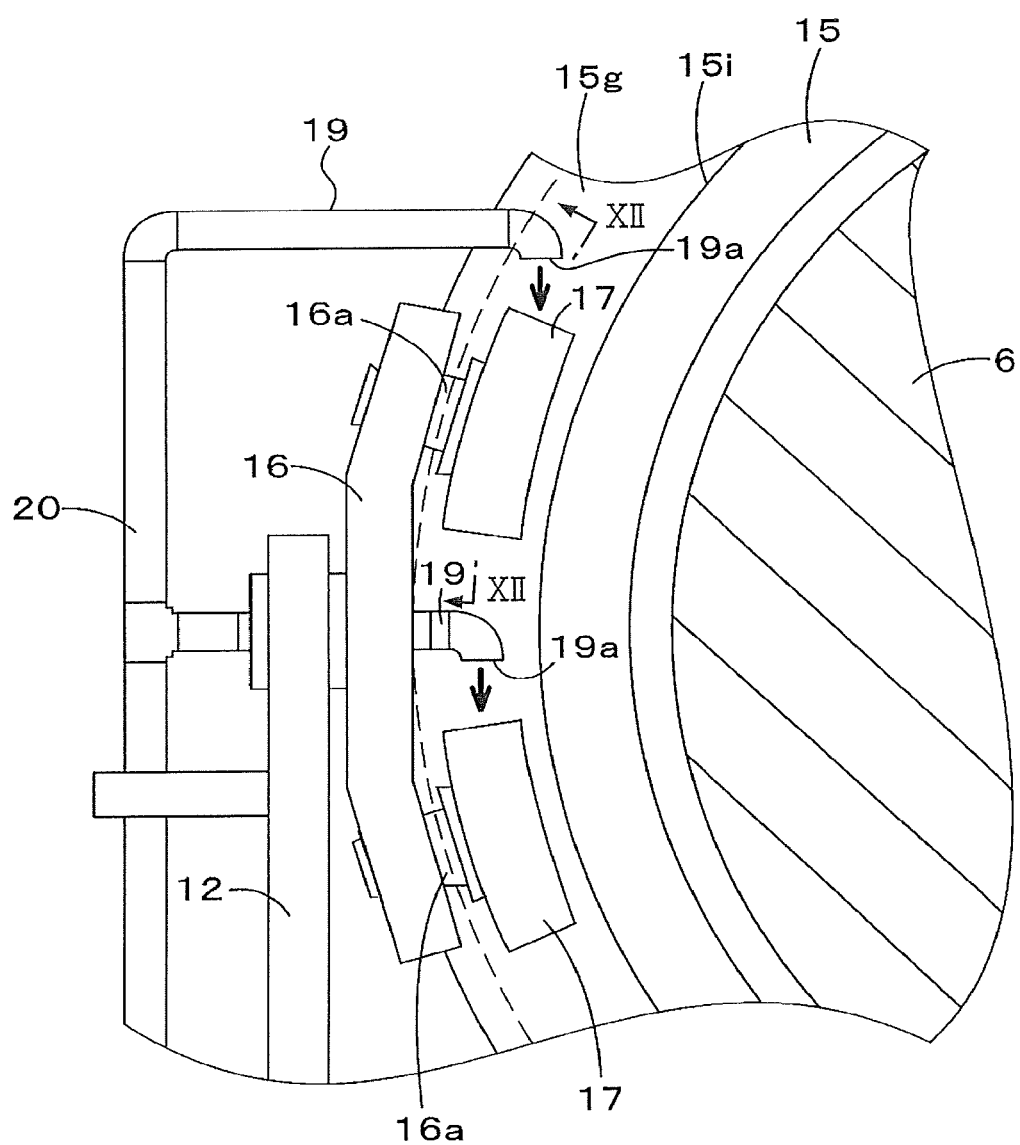
FIG. 5 is an enlarged elevational view of a portion including bushes and a lubricant supplier of the speed reducer shown in FIG. 2.

To the support portion 16a, for example, as shown in FIG. 5, a projecting member and a bearing 18 are mounted, the projecting member being secured to the upper end or the lower end of the support member 16 so as to protrude beyond that end toward the bottom surface 15i of the annular groove 15f of the shifter 15, the bearing 18 being secured to the distal end of the projecting member to support the bush 17 so as to allow the bush 17 to swing. In cooperation with the support members 16, the projecting members and the bearings 18 constitute a first support unit supporting that supports the plurality of bushes 17 so as to allow them to swing individually. In addition, the clutch 11 constitute a second support unit that supports the first support unit including the right and left support members 16 so as to allow the first support to swing.

It is preferable that the support portion 16a and the bush 17 are coupled to each other so as to allow the bush 17 to swing in any direction, including the vertical and horizontal (left-to-right) directions, i.e., to swing freely in three dimensions. For example, preferable is coupling such as using a ball joint that allows the bush 17 to swing on a sphere.

The support member 16 according to the present embodiment has a curved shape along the circumference of the annular shifter 15, such as an arc shape, when viewed in the axial direction of the support shaft 16. However, the support member 16 is not limited to a particular shape but allowed to have any shape capable of supporting each of the vertically spaced bushes 17. Alternatively, it is also possible that the support member 16 is supported so as to be swingable at its longitudinally central portion by the arm member 12. Also in this case, it is possible to employ a structure similar to that for coupling the support member 16 and the bush 17, for coupling the arm member 12 and the support member 16. For example, providing an upper end of the arm member 12 with a spherical ball and coupling the longitudinally central portion of the support member 16 to the ball so as to allow the central portion to rotate on the ball enable the support member 16 to swing freely in any direction, including the vertical and horizontal directions.

The plurality of bushes 17 are disposed in the annular groove 15f and aligned in the circumferential direction of the shifter 15, further being movable between the front opposition surface 15h and the rear opposition surface 15g of the shifter 15 in the front-and-rear direction on the outer circumferential surface of the output shaft 6. For example, focusing on the two bushes 17 disposed to the right side (to the left side, on the drawing sheet of FIG. 2) of the output shaft 6, the bushes 17 are disposed at upper and lower positions, respectively, at approximately equal distances from a center in the top-and-bottom direction, and supported individually by the right support member 16. Similarly, the two bushes 17 disposed to the left (to the right side, on the drawing sheet of FIG. 2) of the output shaft are disposed at upper and lower positions, respectively, at approximately equal distances from a center in the top-and-bottom direction, and supported individually by the left support member 16.

In summary, the plurality of bushes 17 according to the present embodiment are supported on the respective opposite upper and lower ends of the support members 16, and disposed so as to be opposed to each other across the output shaft 6 in the right-and-left direction. The plurality of bushes 17 are, thus, supported independently of each other by the upper and lower support portions 16a of the support members 16. Thus pressing the shifter 15 by each of the plurality of bushes 17 thus aligned circumferentially of the shifter 15 allows the area where the plurality of bushes 17 apply a pressing force to the shifter 15 to be increased and thereby increasing their allowable load capacity.

The above distributed arrangement of the bushes 17 makes it possible to increase their allowable load capacity by increasing the ratio of the length in a radial direction of the shifter 15 to the length in the circumferential direction of the shifter 15, with respect to one bush 17, compared to upsizing a single bush.

Figure 6:
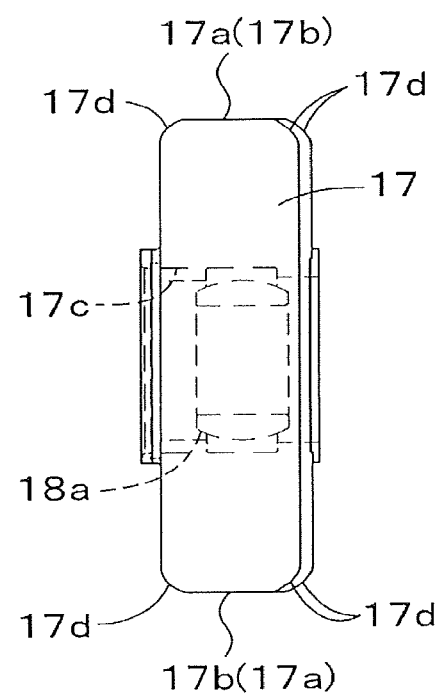
FIG. 6 is a plan view showing a case where a spherical plain bearing is placed in the bush.

As shown in FIGS. 5 and 6, each of the plurality of bushes 17 is formed of a substantially rectangular plate, having a plurality of side wall faces including a front press surface 17*a* and a rear press surface 17*b*. The front press surface 17*a* is a surface that is opposed to the front opposition surface 15*h* (the front wall surface of the annular groove 15*f*) of the shifter 15 and capable of pressing the front opposition surface 15*h* in surface contact therewith. The rear press surface 17*b* is a surface that is opposed to the rear opposition surface 15*g* (the rear wall surface of the annular groove 15*f*) of the shifter 15 and capable of pressing the rear press surface 15*g* in surface contact therewith.

The front press surface 17*a* and the rear press surface 17*b* of each bush 17 are opposed to each other in the front-and-rear direction. The front press surface 17*a* and the rear press surface 17*b* have respective predetermined areas.

It is preferable that one of each of the press surfaces 17*a* and 17*b* of the bush 17 and each of the opposition surfaces 15*g* and 15*h* of the shifter 15 (either the press surfaces or the opposition surfaces) is made of steel material and the other (either the opposition surfaces or the press surfaces) is made of non-ferrous metal. For example, in the case where each of the front press surface 17*a* and the rear press surface 17*b* of the bush 17 is made of a non-ferrous metal, each of the rear opposition surface 15*g* and the front opposition surface 15*h* of the shifter 15 is preferably made of a steel material.

Thus forming one of each of the press surfaces 17*a* and 17*b* of the bush 17 and each of the opposition surfaces 15*g* and 15*h* of the shifter 15 (either the press surfaces or the opposition surfaces) of steel material and forming the other (either the opposition surfaces or the press surfaces) of non-ferrous metal makes it possible to reduce the adhesive force between the opposition surfaces 15*g* and 15*h* and the press surfaces 17*a* and 17*b*, which suppresses abrasion of each surface. It is recommended to use aluminum copper as the non-ferrous metal.

Figure 3:
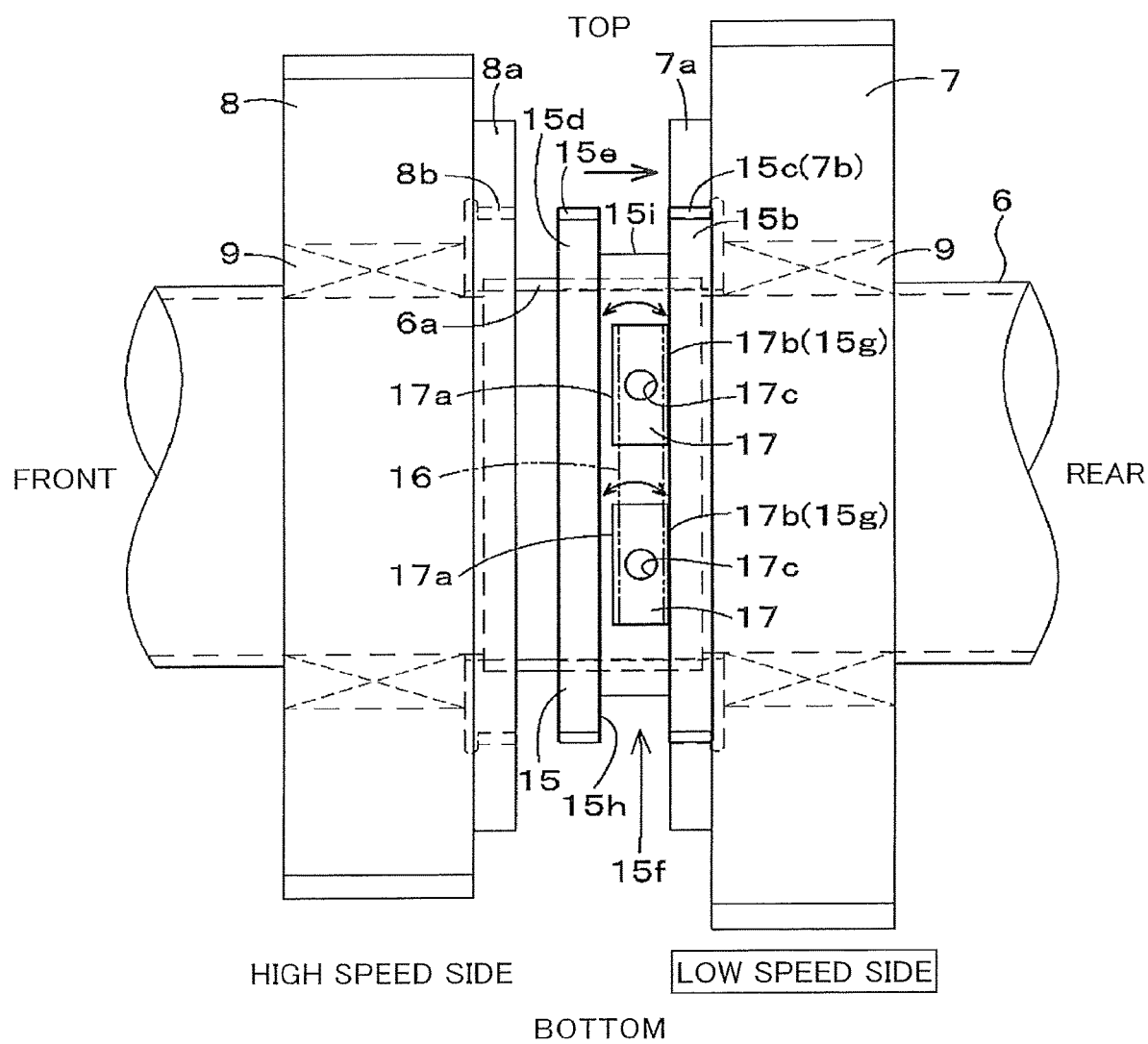
FIG. 3 is a sectional elevational view taken along line III-III of FIG. 2, showing a shifter of the speed reducer having moved to a large low-speed gear.
Figure 4:
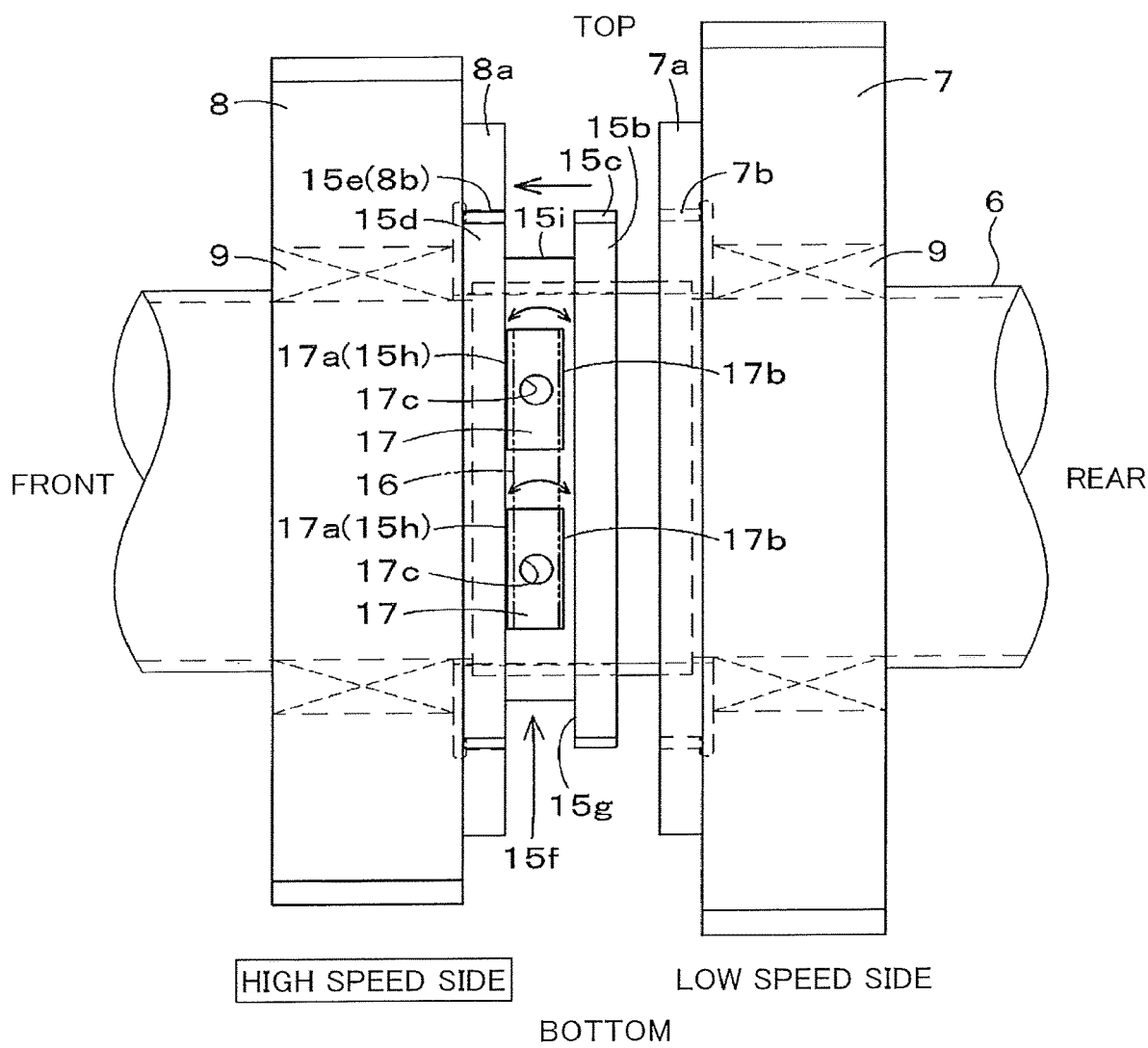
FIG. 4 is a sectional elevational view taken along line III-III of FIG. 2, showing the shifter having moved to a large high-speed gear.

The central portion of the bush 17 is formed with a through-hole passing through the bush 17 in its thickness direction, that is, a radial direction of the shifter 15, and the bearing 18 is disposed in the through-hole. Each of the plurality of bushes 17 is mounted on the support member 16*a* through the bearing 18, whereby the plurality of bushes 17 are supported by the support members 16 so as to be individually swingable. As shown in FIGS. 2 to 4, each of the bushes 17 swings in the axial direction (the front-and-rear direction) of the output shaft 6 and to swing about an axis extending in parallel to the rotational tangential direction of the output shaft 6 (an axis extending in parallel to the front opposition surface 15*h* and the rear opposition surface 15*g* of the shifter 15). Thus, the bush 17 is capable of swinging about the support portion 16*a* in any direction freely and three dimensionally (like rotating on a sphere).

Each of the plurality of bushes 17 thus supported so as to be swingable individually is preferably configured to make a motion like a pendulum in the axial direction of the output shaft 6. In other words, the support member 16 is preferably supported on the support member 12 in such a way as to swing in the front-and-rear direction about a longitudinal center of the support member 16 extending circumferentially of the shifter 15. For example, when the press of the shifter 15 by the upper bush 17 becomes strong while the shifter 15 is engaged with the large low-speed gear 7, the swing of the support member 16 about its longitudinal center allows the upper bush 17 and the lower bush 17 supported on the support member 16 to be moved frontward and rearward, respectively.

Thus, when the press of the shifter 15 by the press surface 17*a* or 17*b* of one of the upper and lower bushes 17 becomes strong, the support member 16 swings about its longitudinal center to move the bush 17 applying a stronger pressure than the opposite bush 17, in a direction away from its corresponding opposition surface 15*g* or 15*h*, i.e., to move the opposite bush 17 in a direction toward its corresponding opposition surface 15*h* or 15*g*; this enables the pressures of the press surfaces 17*a* and 17*b* of the upper and lower bushes 17 to be equalized.

Figure 7:
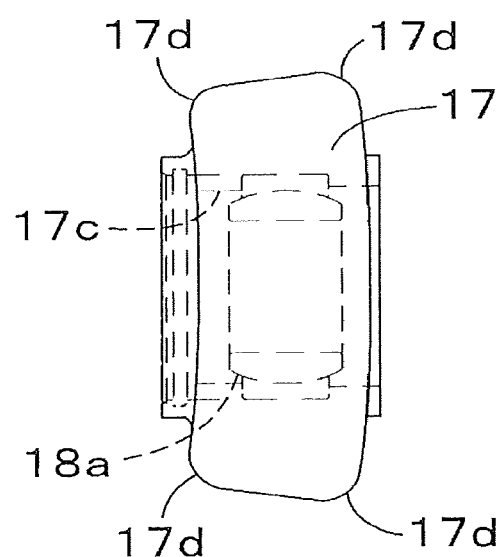
FIG. 7 is an elevational view of the bush shown in FIG. 6.
Figure 8:
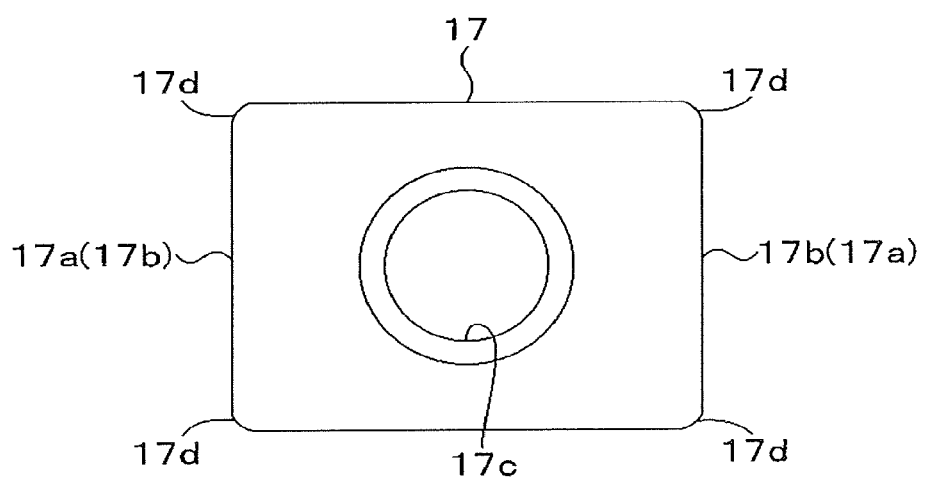
FIG. 8 is a right side view of the bush shown in FIG. 6.
Figure 9:
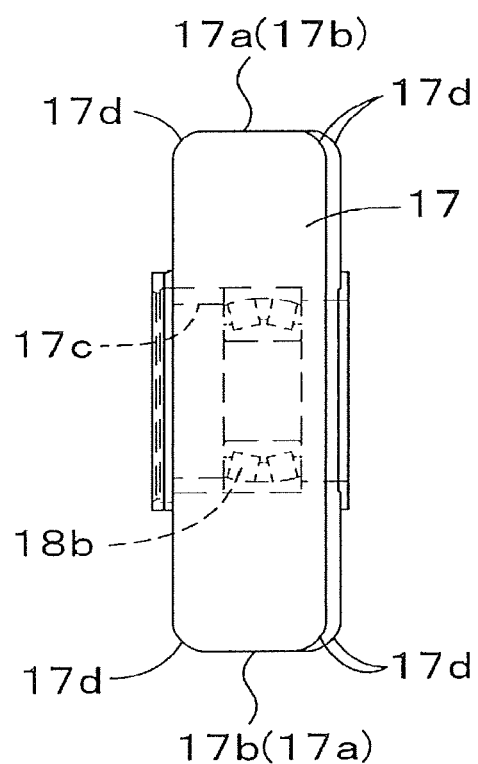
FIG. 9 is a plan view showing a case where a self-aligning bearing is placed in the bush.
Figure 10:
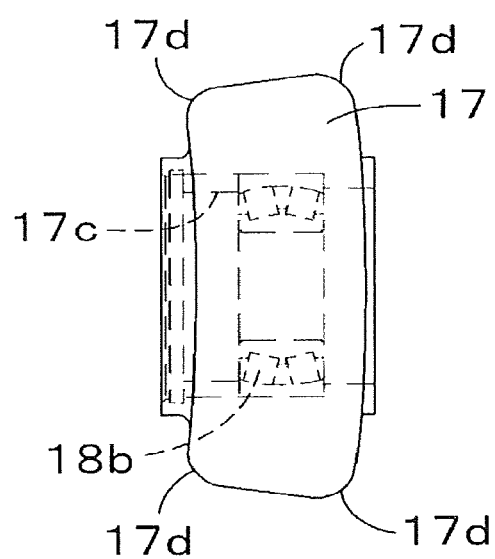
FIG. 10 is an elevational view of the bush shown in FIG. 9.
Figure 11:
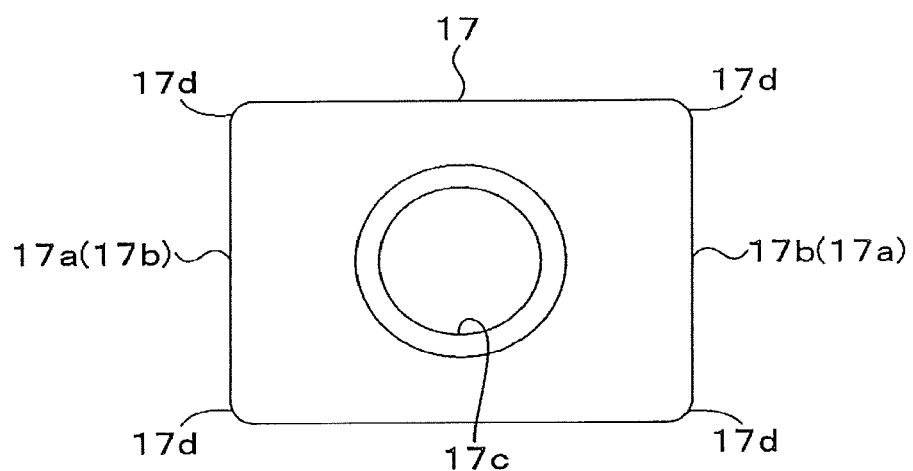
FIG. 11 is a right side view of the bush shown in FIG. 9.

The bearing 18 that is disposed between each of the plurality of bushes 17 and its corresponding support member 16 to allow the bush to swing is, preferably, in the form of a spherical plain bearing 18*a* as shown in FIGS. 6 to 8 or a self-aligning bearing 18*b* as shown in FIGS. 9 to 11, for example. In other words, the preferable member to be interposed between each of the bushes 17 and its corresponding support member 16 is a member that allows the bush 17 to swing three-dimensionally in any direction. The bush 17 shown in FIGS. 6 to 8 includes a supported portion 17*c* enclosing the through-hole, in which the spherical plain bearing 18*a* is fitted. The bush 17 shown in FIGS. 9 to 11 also includes a supported portion 17*c* enclosing the through-hole, in which the self-aligning bearing 18*b* is fitted.

Figure 12:
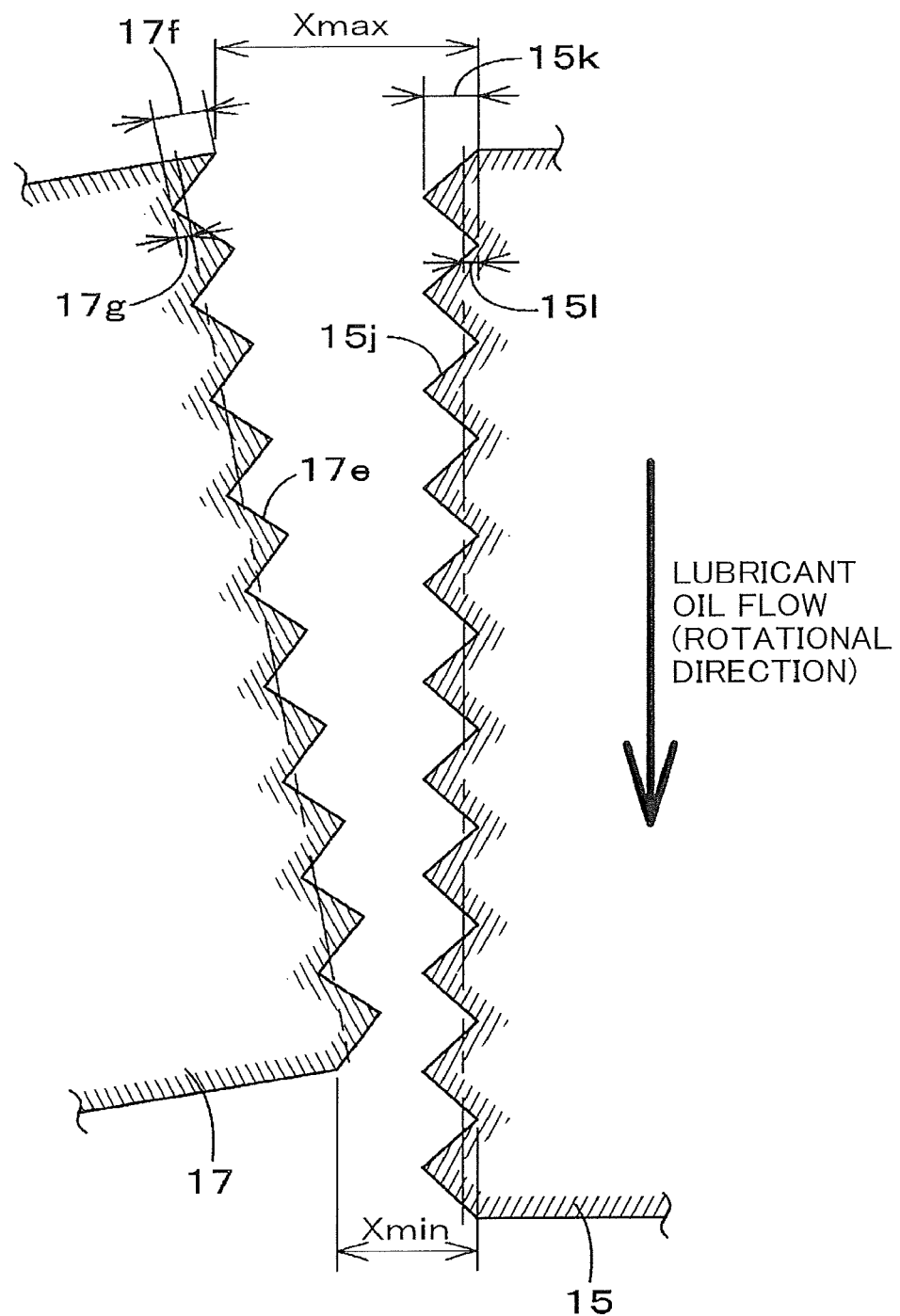
FIG. 12 is an enlarged sectional view taken along line XII-XII of FIG. 5, showing a gap between a press surface of the bush and an opposition surface of the shifter.

Each of the spherical plain bearing 18*a* and the self-aligning bearing 18*b* shown in FIGS. 6 to 8 and FIGS. 9 to 11 interconnects the bush 17 and the support member 16*a* so as to allow the bush 17, which includes the supported portion 17*c* in which the spherical plain bearing 18*a* or the self-aligning bearing 18*b* is fitted, to swing about the axis extending in parallel to the front opposition surface 15*h* and the rear opposition surface 15*g* of the shifter 15 and in parallel to the rotational tangential direction of the output shaft 6, thereby allowing, as shown in FIG. 12, the length of the gap (for example, a maximum length Xmax shown in FIG. 12) between the opposition surface (the front opposition surface 15*h* or the rear opposition surface 15*g*) of the shifter 15 and its corresponding press surface (the front press surface 17*a* or the rear press surface 17*b*) of the bush 17 located upstream (on the upper side in FIG. 12) in a rotational direction of the shifter 15 to be greater than the length of the gap (for example, a minimum length Xmin shown in FIG. 12) located downstream (on the lower side in FIG. 12) in the rotational direction of the shifter 15.

For example, when the shifter 15 is coupled to the large low-speed gear 7 and rotated together with the large low-speed gear 7 to thereby cause the rear opposition surface 15*g* of the shifter 15 to slide in the rotational direction of the shifter 15 while keeping surface contact with the rear press surface 17*b* of the bush 17, the swing of the bush 17 about the axis extending in parallel to the rear opposition surface 15*g* of the shifter 15 allows the gap between the rear press surface 17*b* of the bush 17 and the rear opposition surface 15*g* of the shifter 15 located upstream in the rotational direction of the shifter 15 to be greater than the gap between the rear press surface 17*b* and the rear opposition surface 15*g* located downstream in the rotational direction of the shifter 15.

On the other hand, when the shifter 15 is coupled to the large high-speed gear 8 and rotated together with the large high-speed gear 8 to thereby cause the front opposition surface 15*h* of the shifter 15 to slide while keeping surface contact with the front press surface 17*a* of the bush 17, the swing of the bush 17 about the axis extending in parallel to the front opposition surface 15h of the shifter 15 allows the gap between the front press surface 17a of the bush 17 and the front opposition surface 15h of the shifter 15 located upstream in the rotational direction of the shifter 15 to be greater than the gap between the front press surface 17a and the front opposition surface 15h located downstream in the rotational direction of the shifter 15. In short, the bush 17 can impart a predetermined inclination to the shifter 15 with respect to the bush 17. This makes it possible to increase the wedge effect between the rear press surface 17b and the rear opposition surface 15g and the wedge effect between the front press surface 17a and the front opposition surface 15h, in a rotation of the shifter 15, to thereby increase the allowable load capacity.

In addition, even when the speed reducer 1 is assembled with an inclination between the rear press surface 17b and the rear opposition surface 15g or between the front press surface 17a and the front opposition surface 15h, an alignment can be performed to allow the rear press surface 17b to reliably make contact with the rear opposition surface 15g or allow the front press surface 17a to reliably make contact with the front opposition surface 15 in a rotation of the output shaft 6 in the assembled speed reducer 1. This alignment makes it possible to equalize the surface pressure in the front press surface 17a and the rear press surface 17b of the bush 17 to thereby prevent the allowable load capacity from being reduced.

Furthermore, the above-described individual support of the plurality of bushes 17 to allow them to swing makes it possible to prevent the shifter 15 from being disengaged from the engagement gear even when the shifter 15 meshing with the engagement gear selected from the large low-speed gear 7 and the large high-speed gear 7 starts to move away from the engagement gear, because one of the upper and lower bushes 17 constantly presses the shifter 15 to prevent the above disengagement. For example, even when the shifter 15 meshing with the large low-speed gear 8 starts to gradually move away from an upper side of the large low-speed gear 7, the lower bush 17 holds the shifter 15 to thereby prevent the shifter 15 from being disengaged from the large low-speed gear 7.

In short, according to the present speed reducer 1, one of the upper and lower bushes 17 surely presses the shifter 15 in the axial direction of the output shaft 6, which allows the engagement of the shifter 15 with the large gear 7 or 8 to be kept.

It is preferable that respective corners 17d of the front press surface 17a and the rear press surfaces 17b of the bush 17 are rounded, as shown in FIGS. 6 to 11. The rounded corners 17d can be prevented from uneven contact. In addition, the rounding enhances equalizing the surface pressure between the front press surface 17a and the rear press surface 17b of the bush 17 to thereby prevent the allowable load capacity from being reduced.

Although the bushes 17 shown in FIG. 2 have respective arc shapes along the circumference of the shifter 15 when viewed in the axial direction of the output shaft 6, the shape of each of the bushes 17 is not limited to the arc shape (curved shape). Also the shape of the bush 17 when viewed in a radial direction of the shifter 15 is not limited to the substantially rectangular shape shown in FIGS. 6 to 11.

For example, when the clutch 11 is operated in a direction to bring the rear press surfaces 17b of the bushes 17 into surface contact with the rear opposition surface 15g of the shifter 15 and the bushes 17 thereby presses the shifter 15 rearward as shown in FIGS. 1 to 3, the shifter 15 is moved in the axial direction of the output shaft 6 on the outer circumferential surface of the output shaft 6 while the internal spline teeth 15a thereof is meshed with the external spline teeth 6a of the output shaft 6, thereby brought into engagement with the large low-speed gear 7 that is the engagement gear. Specifically, the internal spline teeth 7b of the rear projection 7a of the large low-speed gear 7 come into mesh with the external spline teeth 15c of the rear projection 15b of the shifter 15. The output shaft 6, thus, is connected to the input shaft 3 through the large low-speed gear 7 and the small low-speed gear 4 meshed therewith, the torque of the input shaft 3 thereby being transmitted to the output shaft 6 at a predetermined reduction ratio.

In summary, the torque applied to the input shaft 3 is transmitted sequentially through the small low-speed gear 4, the large low-speed gear 7, the internal spline teeth 7b of the rear projection 7a of the large low-speed gear 7, the external spline teeth 15c of the rear projection 15b of the shifter 15, the internal spline teeth 15a of the shifter 15, and the external spline teeth 6a of the output shaft 6, to the output shaft 6, at the predetermined reduction ratio. Meanwhile, the large high-speed gear 8 being separated from the output shaft 6 by the bearing 9 runs idle without performing any power transmission.

Conversely, when the clutch 11 is operated in a direction to bring the front press surfaces 17a of the bushes 17 into surface contact with the front opposition surface 15h of the shifter 15 and the bushes 17 thereby presses the shifter 15 frontward as shown in FIG. 4, the shifter 15 is moved on the outer circumferential surface of the output shaft 6 in the opposite axial direction of the output shaft 6 to the above direction, thereby being brought into engagement with the large high-speed gear 8 that is the engagement gear. Specifically, the internal spline teeth 8b of the front projection 8a of the large high-speed gear 8 come into mesh with the external spline teeth 15e of the front projection 15d of the shifter 15. The output shaft 6, thus, is connected to the input shaft 3 through the large high-speed gear 8 and the small high-speed gear 5 meshed therewith, the torque of the input shaft 3 thereby being transmitted to the output shaft 6 at a predetermined reduction ratio.

In summary, the torque applied to the input shaft 3 is transmitted to the output shaft 6 sequentially through the small high-speed gear 5, the large high-speed gear 8, the internal spline teeth 8b of the front projection 8a of the large high-speed gear 8, the external spline teeth 15e of the front projection 15d of the shifter 15, the internal spline teeth 15a of the shifter 15, and the external spline teeth 6a of the output shaft 6, at the predetermined reduction ratio. Meanwhile, the large low-speed gear 7 being separated from the output shaft 6 by the bearing 9 runs idle without performing any power transmission.

The speed reducer 1 includes a lubricant supply device 25 as shown in FIG. 2. The lubricant supply device 25 supplies lubricating oil to each of the plurality of the bushes 17. Specifically, the lubricant supply device 25 supplies lubricant to the gap between the front press surface 17a of each bush 17 and the opposed front opposition surface 15h of the shifter 15, and the gap between the rear press surface 17b of each bush 17 and the opposed rear opposition surface of the shifter 15.

The lubricant supply device 25 includes a pair of left and right main pipes 20 and pairs of upper and lower branch pipes 19, the upper and lower branch pipes in each pair branching from a distal end of the main pipe 20. Each branch pipe 19 has a distal end, which forms a lubricant supply port 19a. The lubricant supply port 19a of the branch pipe 19 is located upstream of each bush 17 with respect to the rotational direction of the shifter 15. For example, on the right side of the output shaft 6 (on the left side of the drawing sheet of FIG. 2), each branch pipe 19 is disposed over the bush 17 while the lubricant supply port 19a of the branch pipe 19 faces downward. On the other hand, on the left side of the output shaft 6 (on the right side of the drawing sheet of FIG. 2), each branch pipe 19 is disposed under the bush 17 while the lubricant supply port 19a of the branch pipe 19 faces upward.

Each of the main pipes 20 is connected to a not-graphically-shown lubricant storage tank, from which lubricant is supplied to the gap between each bush 17 and the shifter 15 through the main pipes 20 and the branch pipes 19 branching from each main pipe 20. Specifically, the upper and lower branch pipes 19 disposed on the right side of the output shaft 6 (on the left side in FIG. 2) supply lubricant downward to the gap between the front press surface 17a and the front opposition surface 15h or the gap between the rear press surface 17b and the rear opposition surface 15g sliding in surface contact with each other, from respective positions above the gaps. On the other hand, the upper and lower branch pipes 19 disposed on the left side of the output shaft 6 (on the right side in FIG. 2) supply lubricant upward to the gap between the front press surface 17a and the front opposition surface 15h or the gap between the rear press surface 17b and the rear opposition surface 15g, from respective positions below the gap.

Each of the lubricant supply ports 19a of the lubricant supply device 25 is disposed upstream of the bush 17 with respect to the rotational direction of the shifter 15, thereby being allowed to reliably supply lubricant to the gap between the front press surface 17a of each bush 17 and the opposition surface 15h of the shifter 15 and the gap between the rear press surface 17b of each bush 17 and the rear opposition surface 15g of the shifter 15, from respective positions upstream of the gaps at close range. In addition, the rotation of the shifter 15 in the direction shown by the arrow in FIG. 2 causes lubricant injected from each lubricant supply port 19a to be drawn into the gap between each front press surface 17a and the front opposition surface 15h and the gap between each rear press surface 17b and the rear opposition surface 15g to thereby make reliable lubrication between each front press surface 17a and the front opposition surface 15h and the gap between each rear press surface 17b and the rear opposition surface 15g. This makes it possible to suppress heat generation and abrasion of the bushes 17 and the shifter 15 due to the sliding of the front press surface 17a and the front opposition surface 15h being in surface contact with each other and the sliding of the rear press surface 17b and the rear opposition surface 15g being in surface contact with each other.

It is preferred that the surface roughness of each of the press surfaces 17a and 17b and the opposition surfaces 15g and 15h is Xmin/8 μm or less in terms of arithmetic average roughness Ra, wherein Xmin (μm) is, as shown in FIG. 12, the minimum length of the gap between the front press surface 17a and its corresponding opposition surface 15h or the gap between the rear press surface 17b and its corresponding opposition surface 15g, i.e., the minimum length of the gap between the front press surface 17a and its corresponding opposition surface 15h or the gap between the rear press surface 17b and its corresponding opposition surface 15g located downstream in the rotation direction of the shifter 15, as shown in FIG. 12, in a lubrication state in which the lubricant supply device 25 is supplying lubricant.

FIG. 12 shows a roughness curve 15j of the opposition surface (the rear opposition surface 15g or the front opposition surface 15h) of the shifter 15 and a roughness curve 17e of the press surface (the front press surface 17a or the rear press surface 17b) of the bush 17, which are schematically indicated as respective triangular waves. When the maximum roughness height (Rz) 15k of the opposition surface of the shifter 15 is four times its arithmetic average roughness (Ra) 15l, that is, Rz=4Ra, and the maximum roughness height (Rz) 17f of the press surface of the bush 17 is four times its arithmetic average roughness (Ra) 17g, that is, Rz=4Ra, it is preferred that the sum of the maximum roughness height (Rz) 15l of the opposition surface of the shifter 15 and the maximum roughness height (Rz) 17f of the press surface of the bush 19 (the sum is 8Ra) is smaller than the minimum length Xmin of the gap between the press surface 17a or 17b of the bush 17 and its corresponding opposition surface 15g or 15h of the shifter 15 (Xmin≥8Ra). This enables the lubricant supplied in the above-described manner to intervene between the roughness curve 15j of the opposition surface of the shifter 15 and the roughness curve 17e of the press surface of the bush 19 to thereby prevent both the surfaces from direct contact with each other.

The above-mentioned arithmetic average roughness Ra, maximum roughness height Rz, and roughness curve are all specified in JIS B0601. The above condition, therefore, has been derived from the definition of the arithmetic average roughness Ra; the condition, which is specified for the surface roughness of each of the press surfaces 17a and 17b and each of the opposition surfaces 15g and 15h, is that the arithmetic average roughness is Xmin/8 (μm) or less.

Satisfying the condition that the arithmetic average roughness Ra is Xmin/8 (μm), that is, the minimum gap Xmin (μm) is equal to or greater than eight times the arithmetic average roughness Ra, makes it possible to obtain a sufficient film thickness (oil film thickness) of the lubricant. Specifically, regarding the front press surface 17a and the front opposition surface 15h with the lubricant therebetween, and the rear press surface 17b and the rear opposition surface 15g with the lubricant therebetween, the peak of the roughness curve 17e of the press surface and the peak of the roughness curve 15j of the opposition surface are restrained from their contact with each other, which makes it possible to prevent abrasion of the front press surface 17a, the front opposition surface 15h, the rear press surface 17b, and the rear opposition surface 15g.

Next will be described an action of the speed reducer 1. FIGS. 1 and 3 show a state where the shifter 15 is in mesh with the large low-speed gear 7, i.e., a state in which the large low-speed gear 7 corresponds to the engagement gear. On the other hand, FIG. 4 shows a state in which the shifter 15 has been shifted by the clutch 11 to be brought into mesh with the large high-speed gear 8, i.e., a state in which the large high-speed gear 8 corresponds to the engagement gear.

In this speed reducer 1, to set the rotation of the output shaft 6 to the low speed rotation, a rearward operation is applied to the clutch lever 14 of the clutch 11. This operation actuates the clutch 11 to cause the rear press surfaces 17b of the bushes 17 to press the corresponding rear opposition surface 15g of the shifter 15 to move the shifter 15 rearward to the large low-speed gear 7. The rear projection 15b of the thus moved shifter 15 is brought into engagement with the rear projection 7a of the large low-speed gear 7, thus the shifter 15 and the large low-speed gear 7 being intercoupled. More specifically, the external spline teeth 15c formed in the rear projection 15b come into mesh with the internal spline teeth 7b formed in the rear projection 7a.

Preferably, the speed reducer 1 further includes a locking device for locking the clutch lever 14 in its current position so as to prevent the clutch 11 from returning to its neutral state after its operation. In the state where the internal spline teeth 15a of the shifter 15 are in mesh with the external spline teeth 6a of the output shaft 6, the locking device can restrain the shifter 15 from movement toward the large high-speed gear 8 (frontward movement) due to the press applied to the rear opposition surface 15g of the shifter 15 by the rear press surfaces 17b of the bushes 17, that is, can restrain the clutch 11 from returning to the neutral state.

The above-described operation of the clutch 11 brings the shifter 15 into engagement with the large low-speed gear 7 while the shifter 15 being rotatable integrally with the output shaft 6. The large low-speed gear 7 is thereby coupled to the output shaft 6 through the shifter 15, thus the preparation for causing the output shaft 6 to rotate at low speed being completed. Then, the not-graphically-shown electric motor operates to apply a torque to the input shaft 3 connected thereto, and the torque is transmitted to the large low-speed gear 7 through the small low-speed gear 4 secured to the outer circumferential surface of the input shaft 3. Since the large low-speed gear 7 is coupled to the output shaft 6 through the shifter 15 as described above, the torque is transmitted to the output shaft 6 through the small low-speed gear 4 and the large low-speed gear 7, thereby rotating the output shaft 6 at low speed. Therefore, the driving target coupled to the output shaft 6, such as a rotor or a screw shaft, is driven to rotate at low speed.

To change the rotation of the output shaft 6 into a high speed rotation, a frontward operation is applied to the clutch lever 14 of the clutch 11. This operation actuates the clutch 11 to cause the front press surfaces 17a of the bushes 17 to press the corresponding front opposition surface 15h of the shifter 15 to thereby move the shifter 15 from the large low-speed gear 7 frontward to the large high-speed gear 8. The front projection 15d of the thus moved shifter 15 is brought into engagement with the front projection 8a of the large high-speed gear 8, thus the shifter 15 and the large high-speed gear 8 being intercoupled. More specifically, the external spline teeth 15e formed in the front projection 15d come into mesh with the internal spline teeth 8b formed in the front projection 8a.

When included in the speed reducer 1, the above-described locking device can lock the clutch lever 14 in its current position so as to prevent the clutch 11 from returning to the neutral state after its operation. Thus, in the state where the internal spline teeth 15a of the shifter 15 are in mesh with the external spline teeth 6a of the output shaft 6, the locking device can restrain the shifter 15 from movement toward the large low-speed gear (rearward movement) due to the press applied to the front opposition surface 15h of the shifter 15 by the front press surfaces 17a of the bushes 17, that is, restrain the clutch 11 from returning to the neutral state.

The above-described operation of the clutch 11 brings the shifter 15 into engagement with the large high-speed gear 8 while the shifter 15 being rotatable integrally with the output shaft 6. The large high-speed gear 8 is thereby coupled to the output shaft 6 through the shifter 15, thus the preparation for causing the output shaft 6 to rotate at high speed being completed. Then, the electric motor operates to apply a torque to the input shaft 3 connected thereto, and the torque is transmitted to the large high-speed gear 8, through the small high-speed gear 5 secured to the outer circumferential surface of the input shaft 3. Since the large high-speed gear 8 is coupled to the output shaft 6 through the shifter 15 as described above, the torque is transmitted to the output shaft 6 through the small high-speed gear 5 and the large high-speed gear 8, thereby rotating the output shaft 6 at high speed. Therefore, the driving target coupled to the output shaft 6, such as a rotor or a screw shaft, is driven to rotate at high speed.

The speed reducer 1, as described above, makes it possible to selectively change the rotational speed of the output shaft 6 between a plurality of rotational speeds (between low speed and high speed in the above described embodiment) easily and reliably only through an operation onto the clutch lever 14 of the clutch 11. The above-mentioned terms "low speed" and "high speed" are relative expressions. The rotational speed of the output shaft 6 is a speed having been already reduced by the speed reducer 1 and, therefore, the output shaft 6 is rotated at a lower rotational speed than that of the input shaft 3.

It should be understood that the embodiment disclosed herein is illustrative, and is not intended to limit the claimed invention in any way. Particularly, matters not specifically described in the embodiment disclosed herein, such as a running condition, an operation condition, various parameters, a component dimension, a component weight, and a component volume, are within the scope normally implemented by the person skilled in the art, and employ values which will be easily determined by the person skilled in the art.

For example, in the present invention, the plurality of bushes are not limited to a particular number of bushes and the bush support that supports the plurality of bushes is not limited to a particular structure. Below will be described modifications of the plurality of bushes and the bush support with reference to FIGS. 13 and 14.

Figure 13:
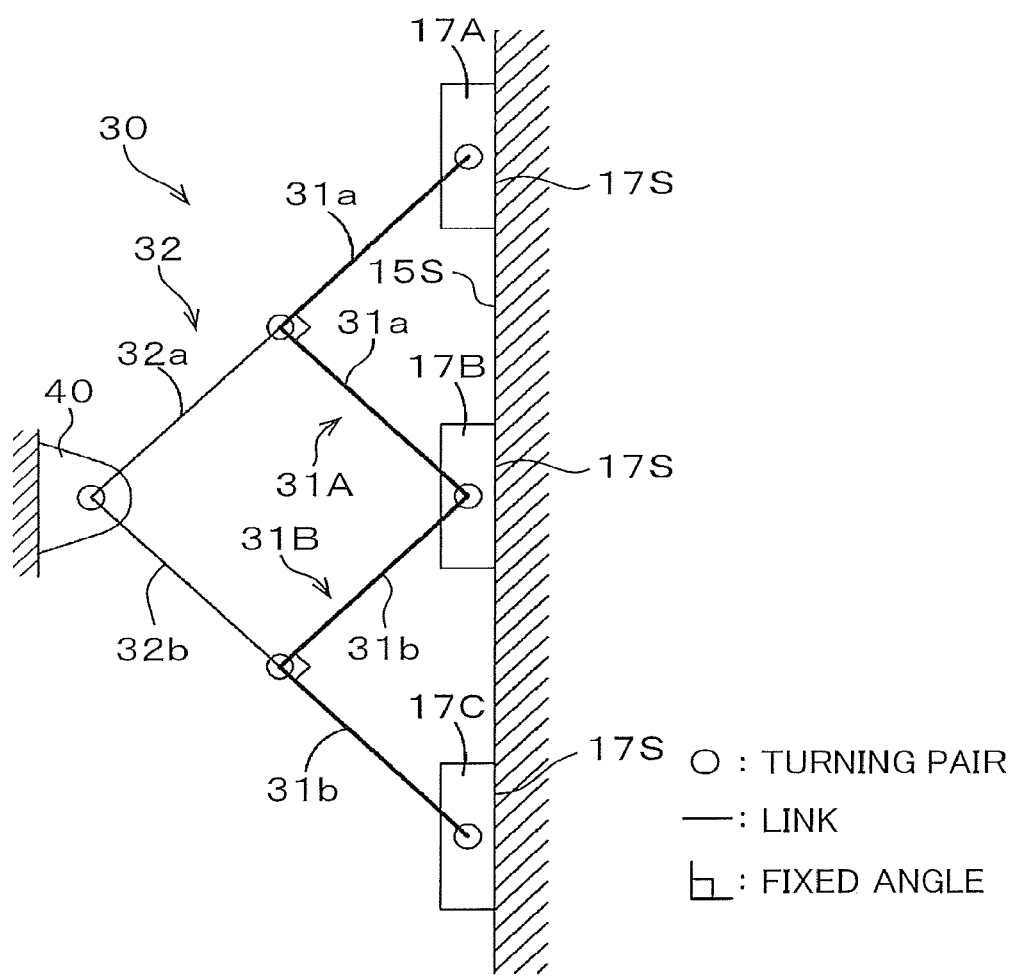
FIG. 13 is a schematic view of a modified bush support that supports a plurality of bushes.

Similarly to the above-descried embodiment, the modification shown in FIG. 13 includes a shifter 15 having an opposition surface 15s, a plurality of bushes each having a press surface 17s, and a bush support 30 that supports the plurality of bushes; however, the plurality of bushes include three bushes, namely, an upper bush 17A, a middle bush 17B, and a lower bush 17C aligned in this order from top to bottom, and the opposition surface 15s of the shifter 15, the respective press surfaces 17s of the bushes 17A to 17C are all plane. The bushes 17A to 17C are disposed at respective three positions vertically aligned in a circumferential direction of the shifter 15 (in the top-and-bottom direction in FIG. 13).

The bush support 30 that supports the plurality of bushes 17 includes a pair of upper and lower support members 31A and 31B constituting a first support portion, and a common support member 32 constituting a second support portion that supports the upper and lower support members 31A and 31B so as to allow them to swing.

The upper support member 31A includes upper and lower links 31a and 31a that are coupled to each other, and the lower support member 31B includes upper and lower links 31b and 31b that are coupled to each other. Each of the links 31a and 31a has opposite proximal and distal ends, the respective proximal ends being connected to each other and fixed at a predetermined angle (for example, 90°) with respect to each other. Similarly, each of the links 31b and 31b has opposite proximal and distal ends, the respective proximal ends being connected to each other and fixed at a predetermined angle (for example, 90°) with respect to each other. Thus, the upper and lower support members 31A and 31B form substantially L-shape.

The respective distal ends of the upper and lower links 31a and 31a constituting the upper support member 31A are rotatably connected to the upper bush 17A and the middle bush 17B, respectively, and the upper support member 31A thereby supports the upper bush 17A and the middle bush 17B so as to allow them to swing, individually. Similarly, the respective distal ends of the upper and lower links 31*b* and 31*b* constituting the lower support member 31B are rotatably connected to the middle bush 17B and the lower bush 17C, respectively, and the lower support member 31B thereby supports the middle bush 17B and the lower bush 17C so as to allow them to swing individually. In other words, the upper bush 17A and the middle bush 17B are supported by the upper support member 31A through a turning pair so as to be swingable individually, and the middle bush 17B and the lower bush 17C are supported by the lower support member 31B through a turning pair so as to be swingable individually.

The common support member 32 supports each of the upper and lower support members 31A and 31B through a turning pair so as to allow it to swing, while being supported by a main body of a clutch 11 so as to be swingable. Specifically, the common support member 32 includes a pair of upper and lower links 32*a* and 32*b*. The upper link 32*a* has a proximal end coupled to a support bracket 40 of the clutch 11 through a turning pair so as to be swingable and a distal end opposite to the proximal end, the distal end being coupled to the respective proximal ends of the links 31*a* and 31*a* of the upper support member 31A through a turning pair so as to be swingable. Similarly, the lower link 32*b* has a proximal end coupled to the support bracket 40 with a turning pair so as to be swingable and a distal ends opposite to the proximal end, the distal end being coupled to the respective proximal ends of the links 31*b* and 31*b* of the lower support member 31B with a turning pair so as to be swingable.

Figure 14:
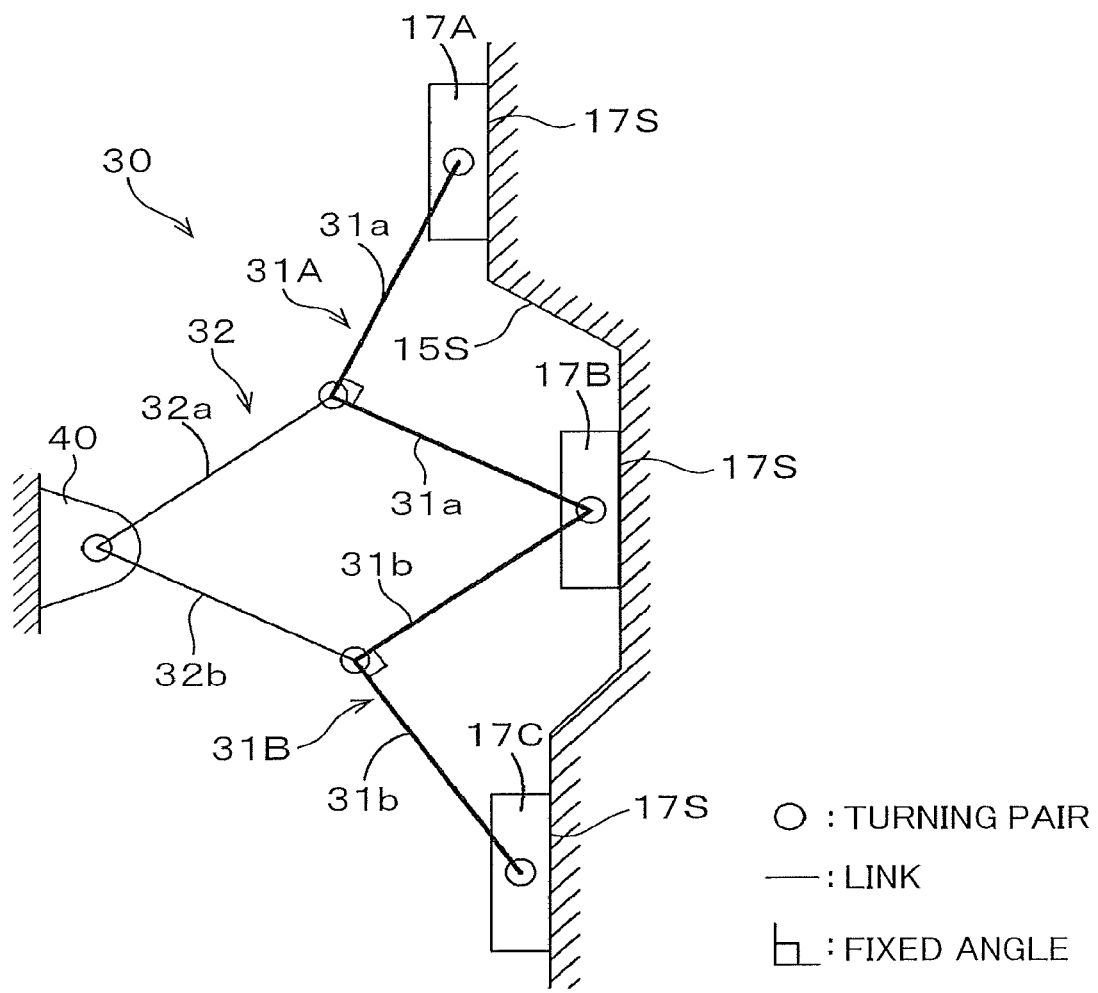
FIG. 14 is a schematic view of showing a state where the support shown in FIG. 13 has been deformed according to the shape of the opposition surface.
Figure 15:
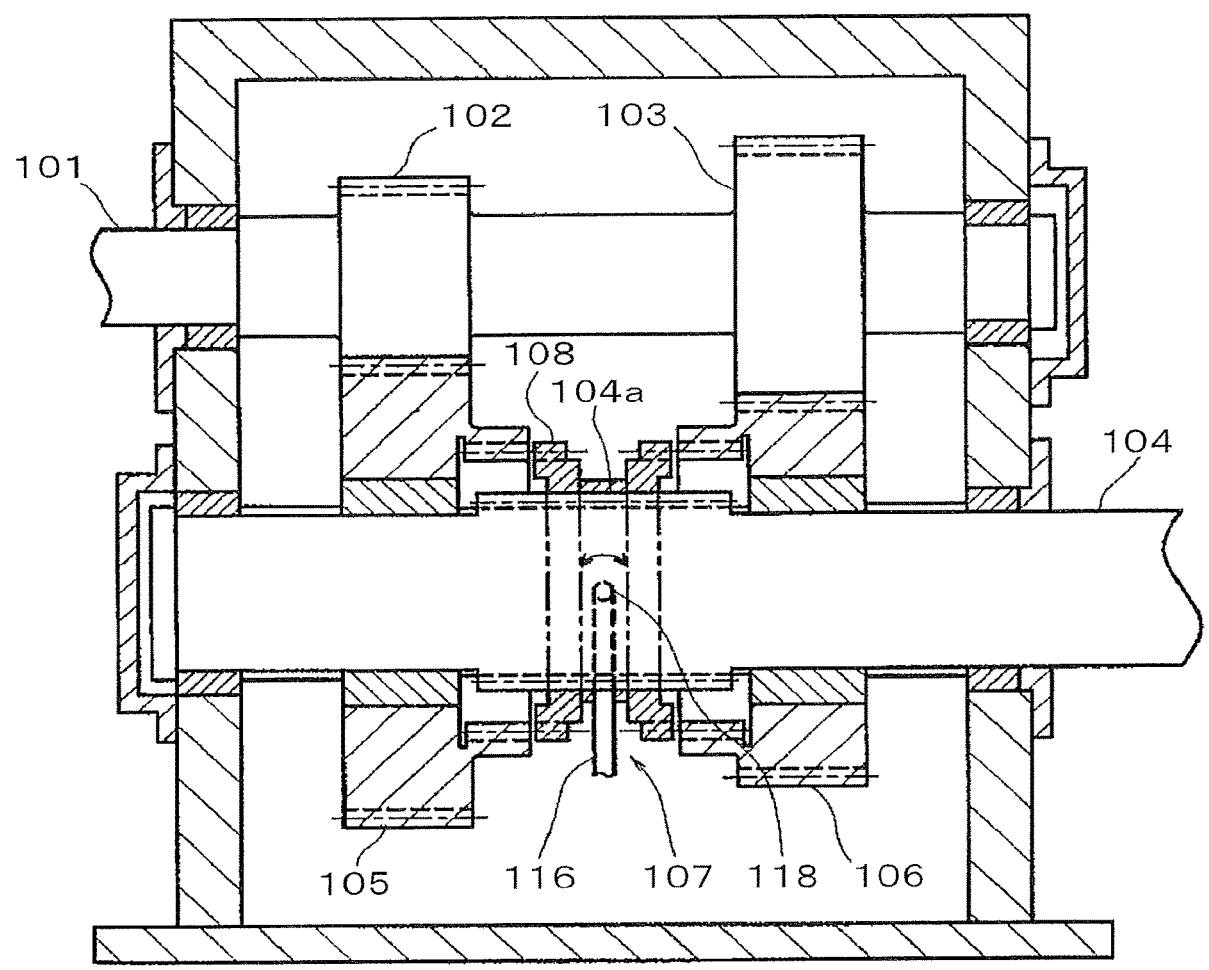
FIG. 15 is a sectional elevational view of a conventional speed reducer.

Thus, in the bush support 30 according to the modification shown in FIG. 13, the upper and lower support members 31A and 32B and the common support member 32 constitute a link mechanism including the plurality of turning pairs, and the three bushes 17A to 17B vertically aligned along the opposition surface 15*s* of the shifter 15 are supported by the clutch 11 through the link mechanism so as to be individually swingable. Even when the opposition surface 15*s* has a shape with fine irregularities as shown in FIG. 14 (exaggeratedly shown in FIG. 14), the link mechanism is flexibly deformed to conform to that shape, thereby allowing the bushes 17A to 17C to press the opposition surface 15*s* with equalized press force. In short, the link mechanism can equalize the allowable press loads that are applied by the bushes 17A to 17C to the opposition surface 15*s*, respectively, no matter whether the opposition surface 15*s* has slight irregularities, and thereby prevent reduction in the load capacity.

As shown in the above-described embodiment and modification, the plurality of bushes according to the present invention is not limited to a particular number of bushes. The technique according to the present invention can be applied to various types of speed reducers required to change the rotational speed of an output shaft corresponding to the rotational speed of an input shaft, over different levels.

As described above, provided is a speed reducer including a shifter for changing the speed of an output shaft and a hush operable to press the shifter to bring it into engagement with a gear for speed reduction, the speed reducer being capable of suppressing heat generation and abrasion due to surface contact of the bush and the shifter with each other while reliably retaining the engagement of the shifter with the gear.

Provided is a speed reducer includes: an input shaft; an output shaft; a plurality of gears rotatably supported on the output shaft; a shifter mounted on the output shaft movably in an axial direction of the output shaft relatively to the output shaft so as to be capable of being selectively engaged with each of the plurality of gears, the shifter having a ring-shape to be fitted on the output shaft and being operable to couple an engagement gear, which is a gear included in the plurality of gears and engaged with the shifter, to the output shaft to thereby allow a torque of the input shaft to be transmitted to the output shaft through the engagement gear; a plurality of bushes operable to press the shifter to move the shifter to the engagement gear and to thereby bring the shifter into engagement with the engagement gear; and a bush support that supports the plurality of bushes. The shifter has an outer circumferential surface formed with an annular groove extending circumferentially of the shifter and being opened radially outward of the shifter. The plurality of bushes are disposed in the annular groove and spaced circumferentially of the shifter, each of the plurality of bushes having a press surface to come into surface contact with the shifter and press the shifter in a direction parallel to the axial direction of the output shaft. The bush support supports the plurality of bushes so as to allow each of the plurality of bushes to individually swing and relatively to the bush support at least in the direction parallel to the axial direction.

According to this speed reducer, the plurality of bushes, which are aligned circumferentially of the shifter and supported on the bush support so as to be swingable at least in the direction parallel to the axial direction of the output shaft, press the shifter to bring it into engagement with the engagement gear. Therefore, even when any one of the bushes starts to move away from the shifter, the other bushes continue pressing the shifter to thereby prevent the shifter from being disengaged from the engagement gear. Furthermore, it is possible to suppress heat generation and abrasion due to sliding of the plurality of bushes and the shifter relative to each other with their surface contact.

The bush support preferably supports the plurality of bushes so as to allow each bush to swing in any direction, individually. This enables the bush to press the shifter while making surface contact with the shifter in a more proper attitude. Specifically, the bush support preferably includes a plurality of bearings coupled to the plurality of bushes, respectively, each of the bearings being a spherical plain bearing or a self-aligning bearing.

The bush support preferably includes a first support member extending along a circumference of the output shaft and a second support member supporting the first member, the first support member supporting the plurality of bushes so as to allow the bushes to swing individually and having longitudinally opposite ends each supporting the bush. This allows the first support member to stably support the bushes coupled to the longitudinally opposite ends thereof, respectively.

The second support member preferably supports a longitudinally central portion of the first support member so as to allow the central portion to swing. The combination of the first and second support members increases movement flexibility of each bush.

Preferably, the speed reducer further includes a lubricant supplier that supplies lubricant to each of the bushes, the lubricant supplier being configured to supply lubricant to a gap between the press surface of the bush and an opposition surface that is a side wall surface of the shifter in the annular groove and is opposed to the press surface.

The lubricant supplier is preferably disposed so as to supply lubricant from a position upstream of each of the plurality of bushes in a rotational direction of the shifter.

The press surface preferably has corners that are rounded.

It is preferable that one of the opposition surface and the press surface is made of a steel material and the other is made of a non-ferrous metal.

It is preferable that each of the press surface and the opposition surface has an arithmetic average roughness equal to or less than one eighth of a minimum length Xmin of the gap between the press surface and the opposition surface.

The invention claimed is:

1. A speed reducer, comprising:
   an input shaft;
   an output shaft;
   a plurality of gears rotatably supported on the output shaft;
   a shifter mounted on the output shaft movably in an axial direction of the output shaft relatively to the output shaft so as to be capable of being selectively engaged with each of the plurality of gears, the shifter having a ring-shape to be fitted on the output shaft and being operable to couple an engagement gear, which is a gear included in the plurality of gears and engaged with the shifter, to the output shaft to thereby allow a torque of the input shaft to be transmitted to the output shaft through the engagement gear;
   a plurality of bushes operable to press the shifter to move the shifter to the engagement gear and to thereby bring the shifter into engagement with the engagement gear; and
   a bush support that supports the plurality of bushes, wherein:
   the shifter has an outer circumferential surface formed with an annular groove extending circumferentially of the shifter and being opened radially outward of the shifter;
   the plurality of bushes are disposed in the annular groove and spaced circumferentially of the shifter, each of the plurality of bushes having a press surface to come into surface contact with the shifter and press the shifter in a direction parallel to the axial direction of the output shaft;
   the bush support supports the plurality of bushes so as to allow each of the plurality of bushes to swing individually and relatively to the bush support at least in the direction parallel to the axial direction; and
   the bush support includes a first support member extending along a circumference of the output shaft and supporting the plurality of bushes so as to allow the bushes to swing individually, and a second support member supporting a longitudinally central portion of the first support member so as to allow the first support member to swing at the longitudinally central portion.

2. The speed reducer according to claim 1, wherein the bush support supports the plurality of bushes so as to allow each bush to swing individually in any direction.

3. The speed reducer according to claim 2, wherein the bush support includes a plurality of bearings coupled to the plurality of bushes, respectively, each of the bearings being a spherical plain bearing or a self-aligning bearing.

4. The speed reducer according to claim 1, wherein the first support member has longitudinally opposite ends each supporting the bush.

5. The speed reducer according to claim 1, further comprising a lubricant supplier that supplies lubricant to each of the bushes, the lubricant supplier being configured to supply lubricant to a gap between the press surface of the bush and an opposition surface that is a side wall surface of the shifter in the annular groove and is opposed to the press surface.

6. The speed reducer according to claim 5, wherein the lubricant supplier is disposed so as to supply lubricant from a position upstream of each of the plurality of bushes in a rotational direction of the shifter.

7. The speed reducer according to claim 5, wherein the press surface has corners that are rounded.

8. The speed reducer according to claim 5, wherein one of the opposition surface and the press surface is made of a steel material and the other is made of a non-ferrous metal.

9. The speed reducer according to claim 5, wherein each of the press surface and the opposition surface has an arithmetic average roughness equal to or less than one eighth of a minimum length Xmin of the gap between the press surface and the opposition surface.

* * * * *